United States Patent
Yang et al.

(10) Patent No.: US 11,469,846 B2
(45) Date of Patent: Oct. 11, 2022

(54) METHOD AND DEVICE FOR DECODING DATA IN WIRELESS COMMUNICATION SYSTEM

(71) Applicant: Samsung Electronics Co., Ltd., Suwon-si (KR)

(72) Inventors: Hayoung Yang, Suwon-si (KR); Chongdon Kim, Suwon-si (KR); Ikbeom Lee, Suwon-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/041,716

(22) PCT Filed: Apr. 3, 2019

(86) PCT No.: PCT/KR2019/003948
§ 371 (c)(1),
(2) Date: Sep. 25, 2020

(87) PCT Pub. No.: WO2019/194577
PCT Pub. Date: Oct. 10, 2019

(65) Prior Publication Data
US 2021/0044372 A1 Feb. 11, 2021

(30) Foreign Application Priority Data

Apr. 5, 2018 (KR) .................. 10-2018-0039939

(51) Int. Cl.
*H04J 13/00* (2011.01)
*H04L 5/00* (2006.01)
*H04L 27/26* (2006.01)

(52) U.S. Cl.
CPC ............ *H04J 13/004* (2013.01); *H04L 5/005* (2013.01); *H04L 5/0094* (2013.01);
(Continued)

(58) Field of Classification Search
CPC ...... H04J 13/00; H04J 13/0007; H04J 13/004; H04L 5/00; H04L 5/0048; H04L 5/005;
(Continued)

(56) References Cited

U.S. PATENT DOCUMENTS

2010/0027499 A1 2/2010 Kent
2018/0041259 A1 2/2018 Kim et al.
(Continued)

FOREIGN PATENT DOCUMENTS

KR 10-1165266 B1 7/2012
KR 10-2017-0089738 A 8/2017
(Continued)

OTHER PUBLICATIONS

European Search Report dated Feb. 9, 2021, issued in European Application No. 19781771.1-1215 / 3745620.
(Continued)

*Primary Examiner* — Warner Wong
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to a method and device for decoding data by a base station in a wireless communication system, and the method of the present invention comprises the steps of: transmitting, by a base station, phase tracking reference signal (PTRS) allocation information, which includes PTRS port information and
(Continued)

orthogonal cover code (OCC) information, to a terminal; receiving, from the terminal, a demodulation reference signal (DMRS) and a PTRS to which an OCC depending on the OCC information has been applied, so as to estimate phase noise; and compensating the phase noise to decode data received from the terminal.

8 Claims, 20 Drawing Sheets

(52) U.S. Cl.
CPC ...... *H04L 27/2607* (2013.01); *H04L 27/2613* (2013.01); *H04L 27/2636* (2013.01)

(58) Field of Classification Search
CPC . H04L 27/261; H04L 27/2613; H04L 5/0091; H04L 5/0094; H04L 27/26; H04L 27/2605; H04L 27/2607; H04L 27/2634; H04L 27/2636; H04L 5/003; H04L 5/0032; H04L 5/0035; H04L 5/0037; H04L 5/0039; H04L 5/0026; H04L 25/0228; H04L 27/0613
See application file for complete search history.

(56) References Cited

U.S. PATENT DOCUMENTS

| | | | |
|---|---|---|---|
| 2018/0331804 A1 | 11/2018 | Hessler et al. | |
| 2018/0367360 A1* | 12/2018 | Huang | H04L 27/2613 |
| 2019/0081844 A1 | 3/2019 | Lee et al. | |
| 2019/0132102 A1 | 5/2019 | Kwak et al. | |
| 2019/0149295 A1* | 5/2019 | Wang | H04L 5/0051 |
| | | | 370/336 |
| 2019/0215118 A1* | 7/2019 | Moles Cases | H04L 41/0803 |
| 2019/0393937 A1* | 12/2019 | Kim | H04W 72/042 |
| 2020/0021470 A1* | 1/2020 | Sun | H04L 1/0003 |
| 2020/0186208 A1* | 6/2020 | Moles Cases | H04L 25/03343 |
| 2020/0213050 A1* | 7/2020 | Chen | H04L 5/0007 |
| 2021/0044400 A1* | 2/2021 | Jiang | H04B 7/0639 |
| 2021/0044467 A1* | 2/2021 | Xi | H04L 5/0007 |
| 2021/0083816 A1* | 3/2021 | Werner | H04L 25/0226 |
| 2021/0135922 A1* | 5/2021 | Gao | H04L 27/26136 |
| 2021/0168011 A1* | 6/2021 | Davydov | H04W 72/042 |
| 2021/0297220 A1* | 9/2021 | Kim | H04L 5/00 |

FOREIGN PATENT DOCUMENTS

| | | | | |
|---|---|---|---|---|
| WO | 2017/138871 A1 | 8/2017 | | |
| WO | 2017/188591 A1 | 11/2017 | | |
| WO | 2017/213483 A1 | 12/2017 | | |
| WO | 2018/027222 A1 | 2/2018 | | |
| WO | WO-2018171800 A1 * | 9/2018 | ............. | H04L 27/26 |
| WO | WO-2018192213 A1 * | 10/2018 | ............... | H04L 5/00 |

OTHER PUBLICATIONS

3GPP TSG RAN WG1 Meeting #91, LG Electronics, 'On PT-RS design', R1-1719913, Reno, USA, Nov. 27-Dec. 1, 2017. Published on Nov. 18, 2017.
3GPP TSG RAN WG1 Meeting #90, Spreadtrum Communications, 'Considerations on PT-RS for CP-OFDM', R1-1713053, Prague, Czech Rep. Aug. 21-25, 2017.
3GPP TSG RAN WG1 Meeting #89, NOKIA, Alcatel-Lucent Shanghai Bell, 'Discussion on PT-RS design for CP-OFDM', R1-1708927, Hangzhou, P. R. China, May 15-19, 2017.
Korean Office Action dated Nov. 10, 2021, issued in Korean Application No. 10-2018-0039939.

* cited by examiner

FIG. 7

| Scheduled bandwidth | Number of blocks (X) | Block size (K) |
|---|---|---|
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

DMRS port #1/#2
DMRS port #3/#4

PTRS port #1

METHOD AND DEVICE FOR DECODING DATA IN WIRELESS COMMUNICATION SYSTEM

TECHNICAL FIELD

The disclosure relates to a wireless communication system, and more particularly, to a method and a device for decoding data by compensating for phase noise in a wireless communication system.

BACKGROUND ART

Generally, mobile communication systems were originally developed to provide voice services while enabling user movement. Mobile communication systems have gradually expanded from voice services to data services, and have been developed to currently be capable of providing high-speed data services. However, because mobile communication systems currently providing services have insufficient resources and users are demanding higher-speed services, more advanced mobile communication systems are required.

In response to these demands, the standardization of a long-term-evolution (LTE) system, under development as a next-generation mobile communication system, is ongoing under the 3rd-Generation Partnership Project (3GPP). LTE is technology for implementing high-speed packet-based communication having a transmission rate of up to 100 Mbps for commercialization by the year 2010. To this end, various methods are under discussion, for example, a method of reducing the number of nodes positioned on a communication path by simplifying the structure of a network or a method of using wireless protocols as close to a wireless channel as possible.

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In order to maximize spectral efficiency, a 5G communication system reduces a guide band region compared to a 4G system, and features a newly designed overhead resource management scheme. Specifically, a reference signal (RS) for channel state measurement and channel estimation for decoding is newly designed for a 5G channel environment. A common RS (CRS) used in a 4G LTE system is excluded, and a tracking RS (TRS) and a phase tracking RS (PTRS) are introduced.

In an ultra-high frequency band, significant phase noise may be generated by an oscillator due to a high carrier frequency, and accordingly a received signal may be distorted. A new PTRS is introduced to prevent deterioration in the performance of the received signal. FIG. 1 illustrates phase noise that occurs due to a voltage-current oscillator (VCO). An orthogonal frequency-division multiplexing (OFDM)-based wireless communication system can estimate and compensate for a common phase error (CPE) that commonly affects OFDM subcarriers using a PTRS in the frequency domain in order to estimate a phase error. In addition, it is possible to reduce the impact of inter-carrier interference (ICI) by estimating and compensating for a phase error for each symbol in the time domain.

DISCLOSURE OF INVENTION

Technical Problem

An aspect of the disclosure is to provide a method and a device for decoding data by estimating and compensating for phase noise without interference or performance deterioration even when PTRSs are allocated to the same resource.

Solution to Problem

To achieve the foregoing aspect, an uplink data decoding method of a base station in a wireless communication system according to the disclosure includes: transmitting phase tracking reference signal (PTRS) allocation information including PTRS port information and orthogonal cover code (OCC) information to a UE; estimating phase noise by receiving a demodulation reference signal (DMRS) and a PTRS to which an OCC is applied according to the OCC information from the UE; and decoding data received from the UE by compensating for the phase noise.

A downlink data decoding method of a user equipment (UE) in a wireless communication system according to the disclosure includes: receiving phase tracking reference signal (PTRS) allocation information including PTRS port information and orthogonal cover code (OCC) information in a frequency domain from a base station; estimating phase noise by receiving a demodulation reference signal (DMRS) and a PTRS to which an OCC is applied according to the OCC information from the base station; and decoding data received from the base station by compensating for the phase noise.

A base station for decoding uplink data in a wireless communication system according to the disclosure includes: a transceiver configured to transmit and receive a signal; and a controller configured to transmit phase tracking reference signal (PTRS) allocation information including PTRS port information and orthogonal cover code (OCC) information to a UE, to estimate phase noise by receiving a demodulation reference signal (DMRS) and a PTRS to which an OCC is applied according to the OCC information from the UE, and to decode data received from the UE by compensating for the phase noise.

A user equipment (UE) for decoding downlink data in a wireless communication system according to the disclosure includes: a transceiver configured to transmit and receive a signal; and a controller configured to receive phase tracking reference signal (PTRS) allocation information including PTRS port information and orthogonal cover code (OCC) information in a frequency domain from a base station, to estimate phase noise by receiving a demodulation reference signal (DMRS) and a PTRS to which an OCC is applied according to the OCC information from the base station, and to decode data received from the base station by compensating for the phase noise.

Advantageous Effects of Invention

According to the disclosure, it is possible to efficiently use resources and improve performance by improving a PTRS transmission method in multiple-input and multiple-output (MIMO) transmission in a communication system having phase noise. Further, according to the disclosure, it is possible to solve deterioration in phase noise estimation performed and deterioration in data channel performance in multi-UE (MU) MIMO, and it is possible to increase spectral efficiency by saving resources for a PTRS.

BRIEF DESCRIPTION OF DRAWINGS

FIG. 7 illustrates the number and size of chunk blocks according to a scheduled bandwidth;

MODE FOR THE INVENTION

Figure 1:
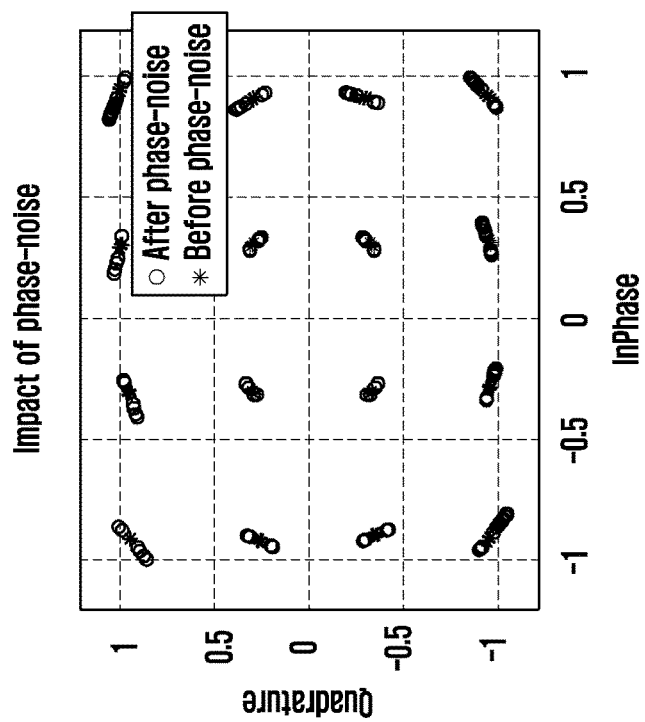
FIG. 1 illustrates phase noise that is generated by a voltage-current oscillator (VCO)
Figure 1:
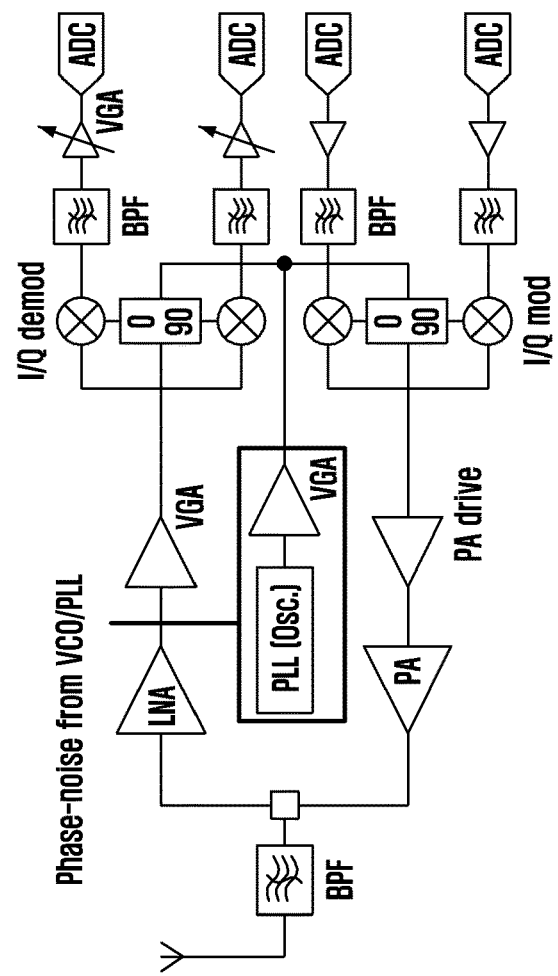

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, methods for a terminal and a base station to estimate phase noise and to decode data by compensating for the phase noise in a wireless communication system will be described. Even when PTRS ports are allocated to the same resource, the base station may estimate phase noise by applying an orthogonal cover code (OCC) to a PTRS, thereby preventing performance deterioration due to interference.

The disclosure relates to a method for decoding data in a wireless communication system, and a PTRS allocation method and an OCC application method are not limited to the embodiments herein, but may be implemented in various manners.

A phase tracking reference signal (PTRS) is a training signal for estimating and compensating for phase distortion due to phase noise, Doppler effect, or a synchronization error. A PTRS for estimating phase distortion has the following characteristics.

First, in single-user multiple-input and multiple-output (SU-MIMO), the number of PTRS ports is equal to the number of oscillators at a transmitter.

Second, in multi-user multiple-input and multiple-output (MU-MIMO), the number of PTRS ports needs to be equal to the number of UEs.

Third, since a PTRS is used to estimate phase distortion between symbols in a slot based on a channel estimated using a DMRS, the number of PTRS ports is less than the number of DMRS ports.

Summarizing these characteristics, it is necessary to associate one DMRS port per DMRS group with a PTRS.

Figure 2:
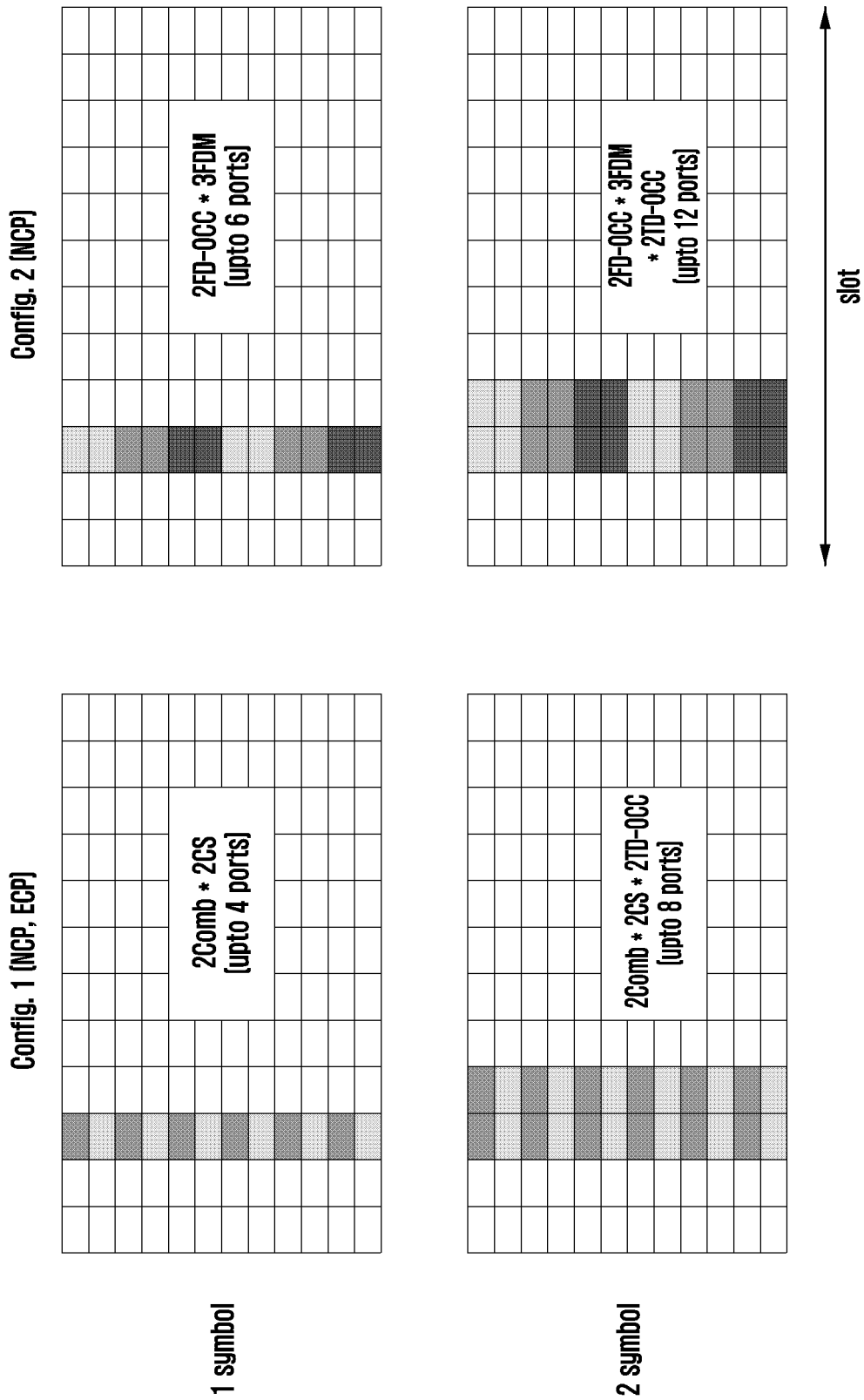
FIG. 2 illustrates a resource allocation scheme for a DMRS.

FIG. 2 illustrates a resource allocation scheme for a DMRS. As shown in FIG. 2, the resource allocation scheme for the DMRS may include two configurations. First, DMRS configuration type 1 can support up to four ports through comb type 2 and cyclic shift 2 when one symbol is allocated. Further, DMRS configuration type 1 can allocate up to eight ports when two symbols are allocated. DMRS configuration type 2 can support up to six DMRS ports when one symbol is allocated, and can support up to 12 DMRS ports when two symbols are allocated by introducing three frequency-division multiplexing (FDM) allocations.

The maximum number of PTRS ports per UE may be two. A configuration and a pattern for a PTRS are as follows. In a multiple-access method, cyclic prefix orthogonal frequency-division multiplexing (CP-OFDM) may be used for a downlink (DL), and CP-OFDM and discrete Fourier transform spread orthogonal frequency-division multiplexing (DFT-s-OFDM) may be used for an uplink (UL).

Figure 3:
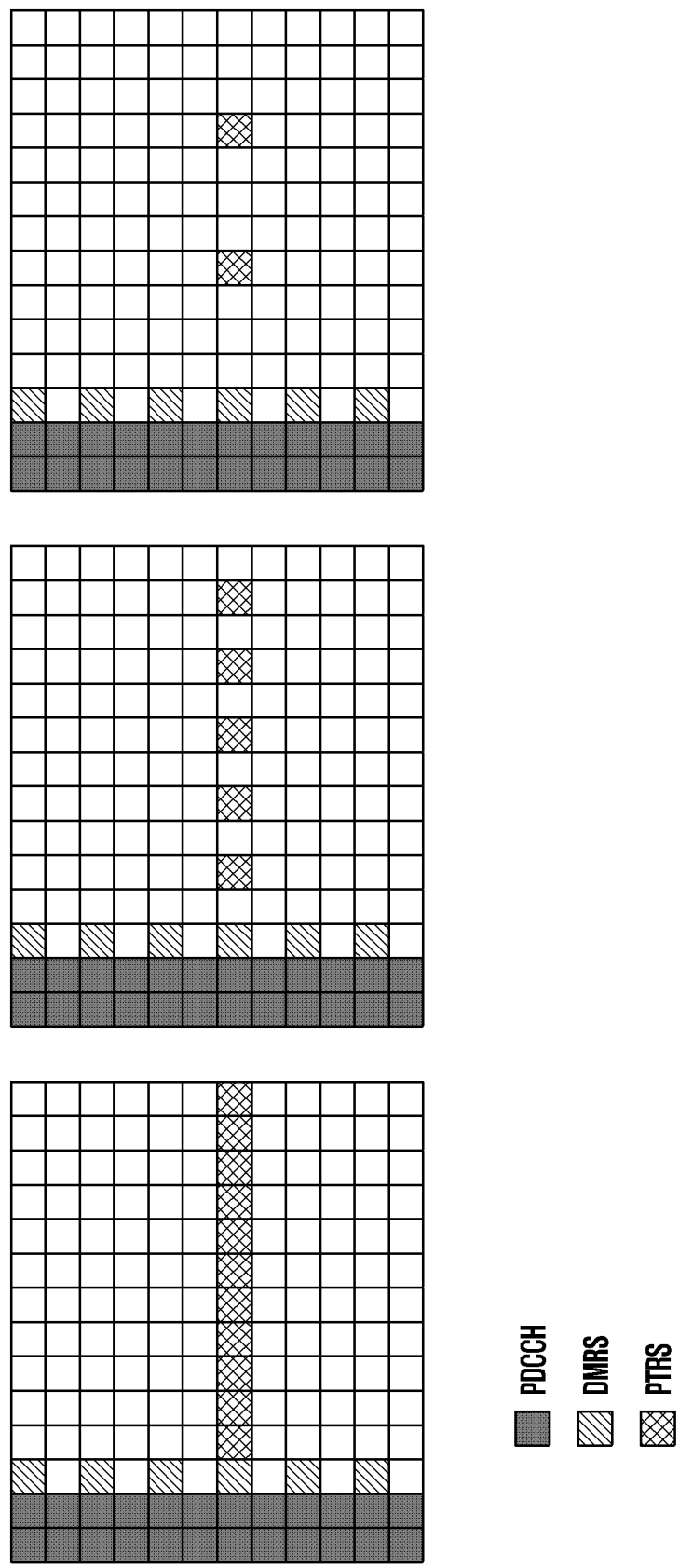
FIG. 3 illustrates a PTRS symbol allocation pattern in a time domain to which CP-OFDM is applied.

FIG. 3 illustrates a PTRS symbol allocation pattern in a time domain to which CP-OFDM is applied. In the time domain, PTRS symbols may be allocated every symbol, every two symbols, or every four symbols. In the frequency domain, PTRS symbols may be configured to be allocated every two RBs or every four RBs. FIG. 3 illustrates an embodiment of allocating time-domain PTRS symbols available in a resource of one RB assuming that two PDCCH symbols and one DMRS symbol are allocated. In FIG. 3, a PDSCH (or data) may be allocated to resource elements other than symbols allocated for a PDCCH and a DMRS and resource elements allocated for a PTRS.

Figure 4:
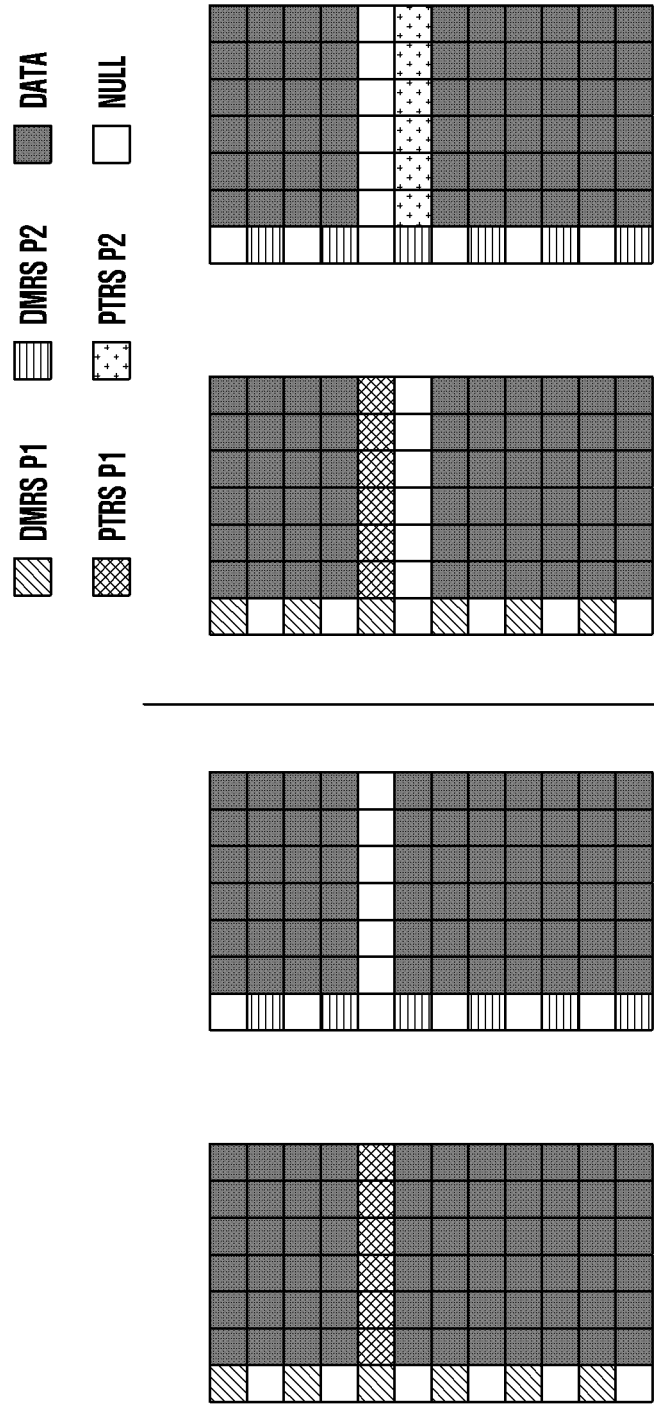
FIG. 4 illustrates a PTRS allocation scheme using orthogonal multiplexing for a SU-MIMO UE.

FIG. 4 illustrates a PTRS allocation scheme using orthogonal multiplexing for a SU-MIMO UE. PTRS symbols may be allocated to be orthogonally multiplexed in SU-MIMO. However, in MU-MIMO, since a PTRS and data may overlap or PTRSs for different UEs may overlap, PTRS symbol may be allocated so as to be non-orthogonally multiplexed.

In FIG. 4, the two diagrams on the left show DMRS and PTRS symbol patterns when one PTRS port is allocated for SU-MIMO two-layer transmission. Assuming that the layer to which the PTRS port is allocated is layer 0 and the layer to which the PTRS port is not allocated is layer 1, a base station may puncture a resource element for layer 1 corresponding to the position of the allocated PTRS port of layer 0, thereby maintaining orthogonality between the two layers.

In FIG. 4, the two diagrams on the right show DMRS and PTRS symbol patterns when two PTRS ports are allocated for SU-MIMO two-layer transmission. Assuming that the layers to which the PTRS ports are respectively allocated are layer 0 and layer 1, the base station may puncture a resource element for layer 1 corresponding to the position of the allocated PTRS port of layer 0 and a resource element for layer 0 corresponding to the position of the allocated PTRS port of layer 1, thereby maintaining orthogonality.

Figure 5A:
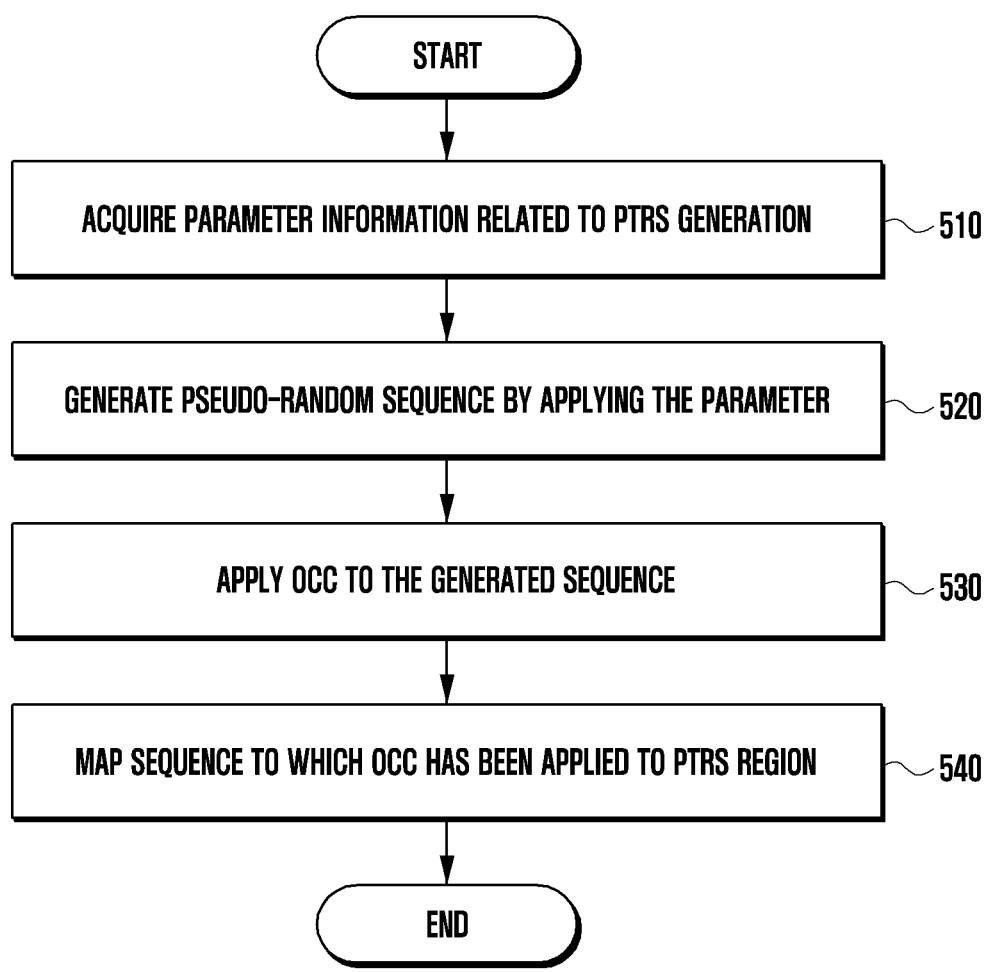
FIG. 5A is a flowchart illustrating a method for generating and mapping a PTRS sequence.

FIG. 5A is a flowchart illustrating a method for generating and mapping a PTRS sequence. In an uplink, a UE may generate a PTRS sequence and may transmit the PTRS sequence to a base station, and in a downlink, a base station may generate a PTRS sequence and may transmit the PTRS sequence to a UE. Operation in the downlink may be the same as that in the uplink except that the entity that generates and maps a PTRS sequence is changed from a UE to a base station. Therefore, a method for generating and mapping an uplink PTRS sequence is illustrated in the following description, and when the entity that generates a PTRS is changed from a UE to a base station, the illustrated method may be a method for generating and mapping a PTRS in the downlink.

First, in operation S510, a UE may obtain parameter information about generation of a PTRS sequence from a higher layer. The parameter information may include a slot number, the number of an OFDM symbol in a slot, a data-scrambling identity, an OCC sequence index, and PTRS resource assignment information. The parameter information may be included in PTRS allocation information that the UE receives from the base station.

In operation S520, the UE may generate a pseudo-random sequence by applying a parameter. The UE may generate the pseudo-random sequence by applying the parameter to a predefined generation polynomial.

In operation S530, the UE may apply an OCC to the generated sequence. The UE may apply the OCC to the pseudo-random sequence using the OCC sequence index and the PTRS allocation information. The UE may apply the OCC (FD-OCC) to CP-OFDM in the frequency domain and may apply the OCC (TD-OCC) to DFT-s-OFDM in the time domain. The method for applying the OCC to the sequence according to the frequency domain or the time domain will be described in detail below with reference to FIG. 11.

In operation S540, the UE may map the sequence to which the OCC is applied to a PTRS region. For example, when generating an uplink PTRS sequence according to DFT-s-OFDM, the UE may map the sequence to which the OCC is applied to the PTRS region using the number of PTRS chunk blocks, the number of samples in a block, and allocation location information. The mapped PTRS sequence will be described in detail below with reference to FIG. 6.

Figure 5B:
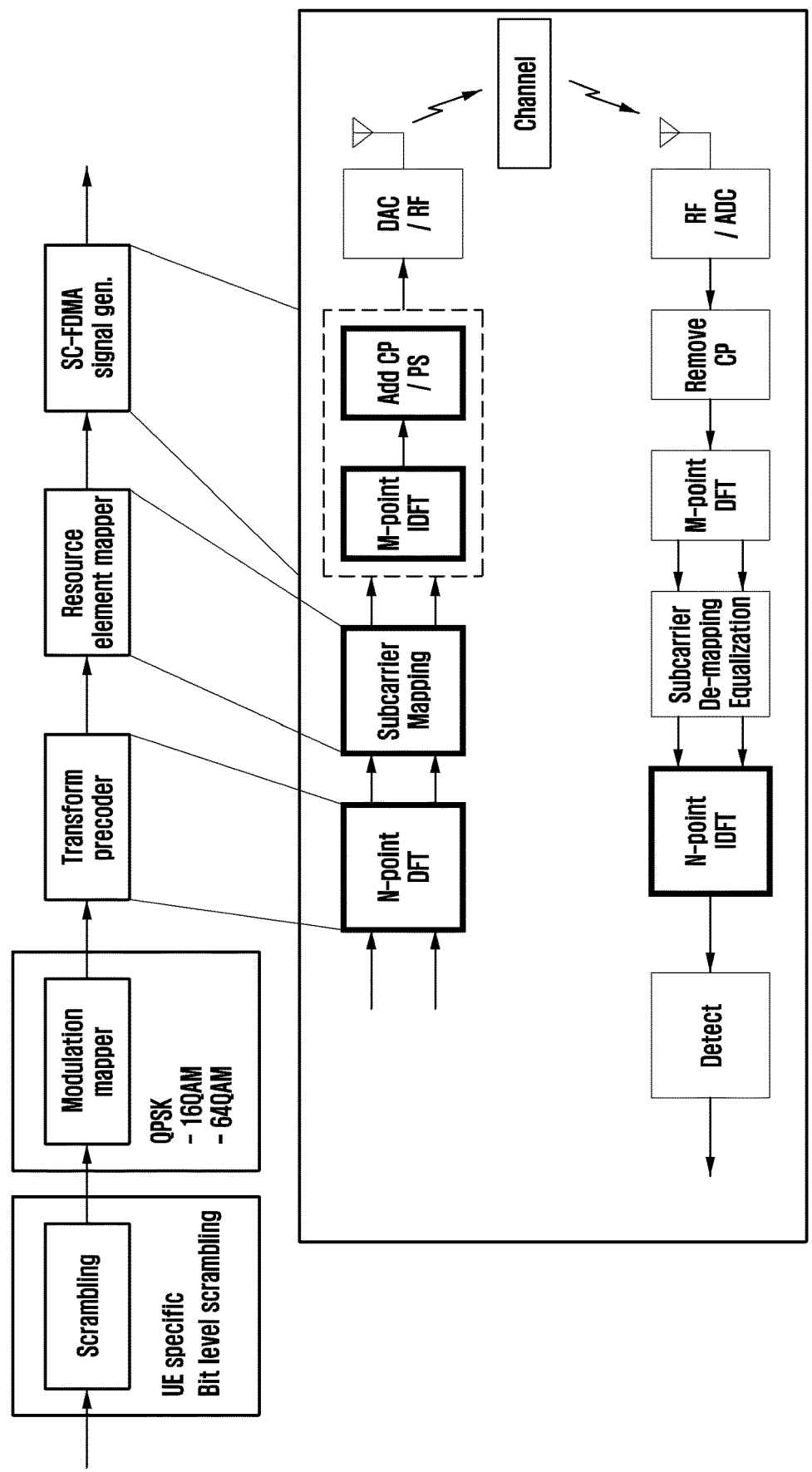
FIG. 5B illustrates a process for generating and processing an uplink signal according to DFT-s-OFDM.

FIG. 5B illustrates a process for generating and processing an uplink signal according to DFT-s-OFDM. A base station may use a pre-DFT symbol allocation scheme for allocating a PTRS symbol in the time domain. The pre-DFT symbol allocation scheme refers to a method of inserting a PTRS symbol in chunks in a time-domain sample before DFT is performed on a scheduled RB region.

Figure 6:
FIG. 6 illustrates a pre-DFT PTRS allocation structure according to DFT-s-OFDM.

FIG. 6 illustrates a pre-DFT PTRS allocation structure according to DFT-s-OFDM. FIG. 7 illustrates the number and size of chunk blocks according to a scheduled bandwidth.

In FIG. 6, a PTRS may be allocated in the form of a chunk including a plurality of consecutive samples. A chunk block may refer to a plurality of PTRSs configured in a chunk. Since a PTRS is transmitted via a sample in a chunk block, a sample in a chunk block may refer to a PTRS. FIG. 7 illustrates the number and size of chunk blocks according to a scheduled bandwidth. A base station may configure the number of chunk blocks to any of 2, 4, and 8 based on the scheduled bandwidth, and the number of samples (PTRSs) of each chunk block may be 2 or 4. The foregoing PTRS chunk pattern is based on one OFDM symbol, and PTRSs may be allocated every OFDM symbol or every two symbols.

Figure 8:
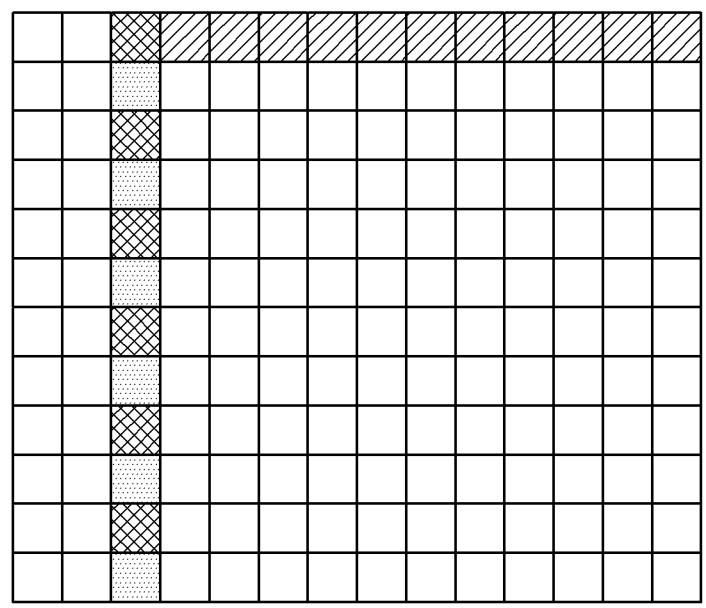
FIG. 8 illustrates an embodiment of mapping a PTRS port to a DMRS port.
Figure 8:
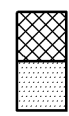
Figure 8:

FIG. 8 illustrates an embodiment of mapping a PTRS port to a DMRS port. In FIG. 3, DMRS port 1/2/3/4 forming the same DMRS port group may be assumed. In addition, since all the DMRS ports form the same DMRS port group, it may be assumed that one oscillator is shared. When one oscillator is shared, the number of PTRS ports may be assumed to be 1 according to the foregoing first characteristic of the PTRS.

FIG. 8 shows that DMRS port #1/#2 are supported through cyclic shift (CS) in a first comb type and that DMRS port #3/#4 are supported through cyclic shift in a second comb type. While a DMRS can distinguish a port by cyclic shift, a PTRS can distinguish a port only by frequency division. Therefore, the following two cases may be considered in PTRS port mapping.

According to a first method, a base station maps a PTRS to the lowest DMRS port number. FIG. 8 shows an embodiment in which a PTRS port is mapped to DMRS port #1. According to a second method, a PTRS is associated with a DMRS port through signaling. A base station may transmit information about association between a PTRS port and a DMRS port to a UE through a DCI/MAC CE or RRC.

Hereinafter, a PTRS mapping method for MIMO transmission will be described.

Figure 9:
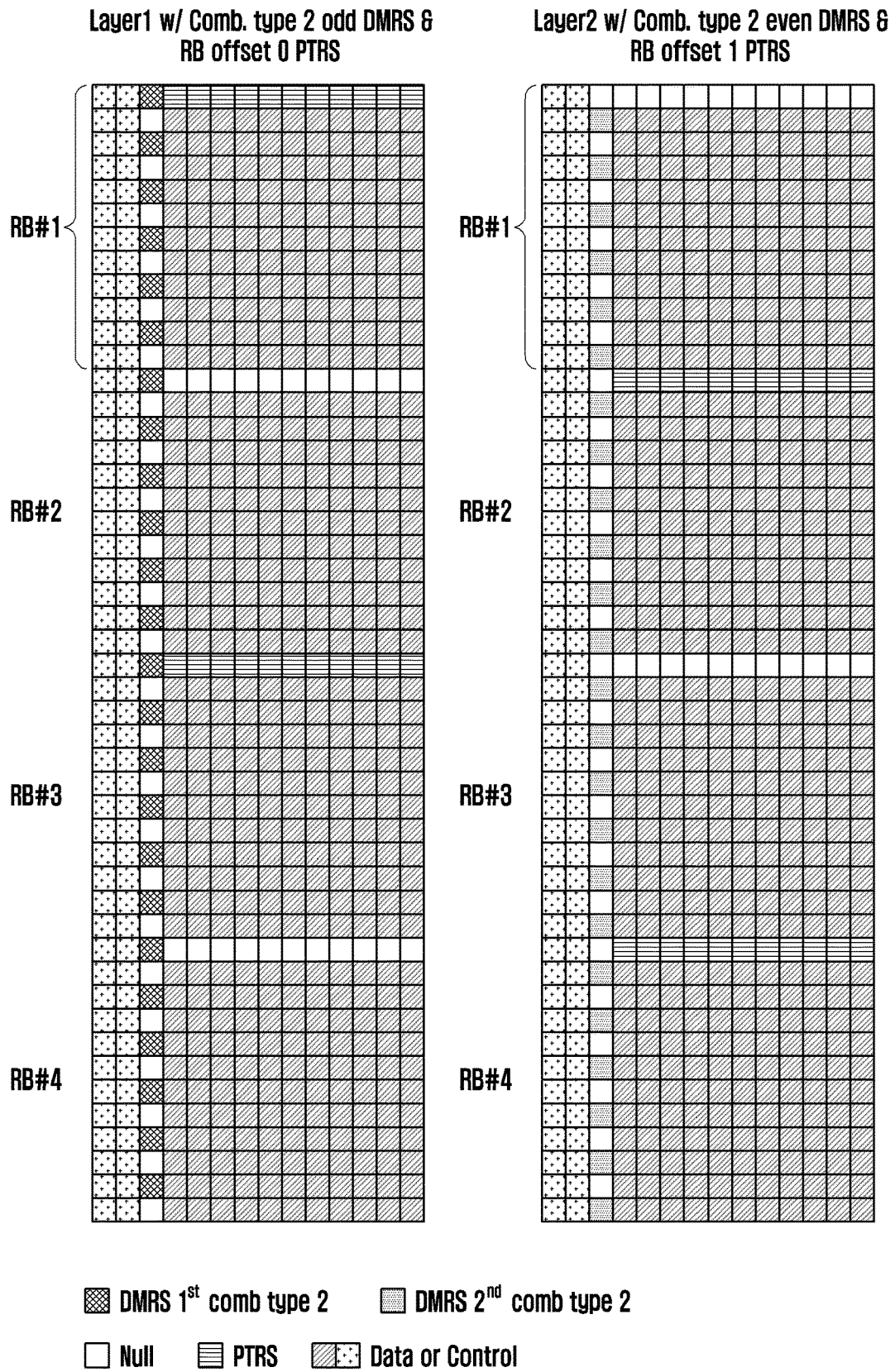
FIG. 9 illustrates a structure in which different resource block (RB) offsets are allocated to PTRSs in SU-MIMO transmission.

FIG. 9 illustrates a structure in which different resource block (RB) offsets are allocated to PTRSs in SU-MIMO transmission. When a DMRS port is classified according to a comb type, a base station may perform mapping as shown in FIG. 9 in an embodiment.

An RB offset and a resource element (RE) offset for a PTRS may be set to be UE-specific. FIG. 9 illustrates a method in which a base station maps DMRS ports of different layers and two PTRS ports by changing an RB offset for a PTRS. That is, FIG. 9 shows an embodiment in which different RB offsets are applied to PTRS ports.

The base station may distinguish the two PTRS ports by applying the same RB offset and different RE offsets. According to an embodiment in which either an RB offset or an RE offset is changed, a base station may use FDM to allocate PTRS ports so as not to overlap each other, thereby guaranteeing orthogonality, and PTRS resources of four REs may be used in an area of four RBs.

Figure 10:
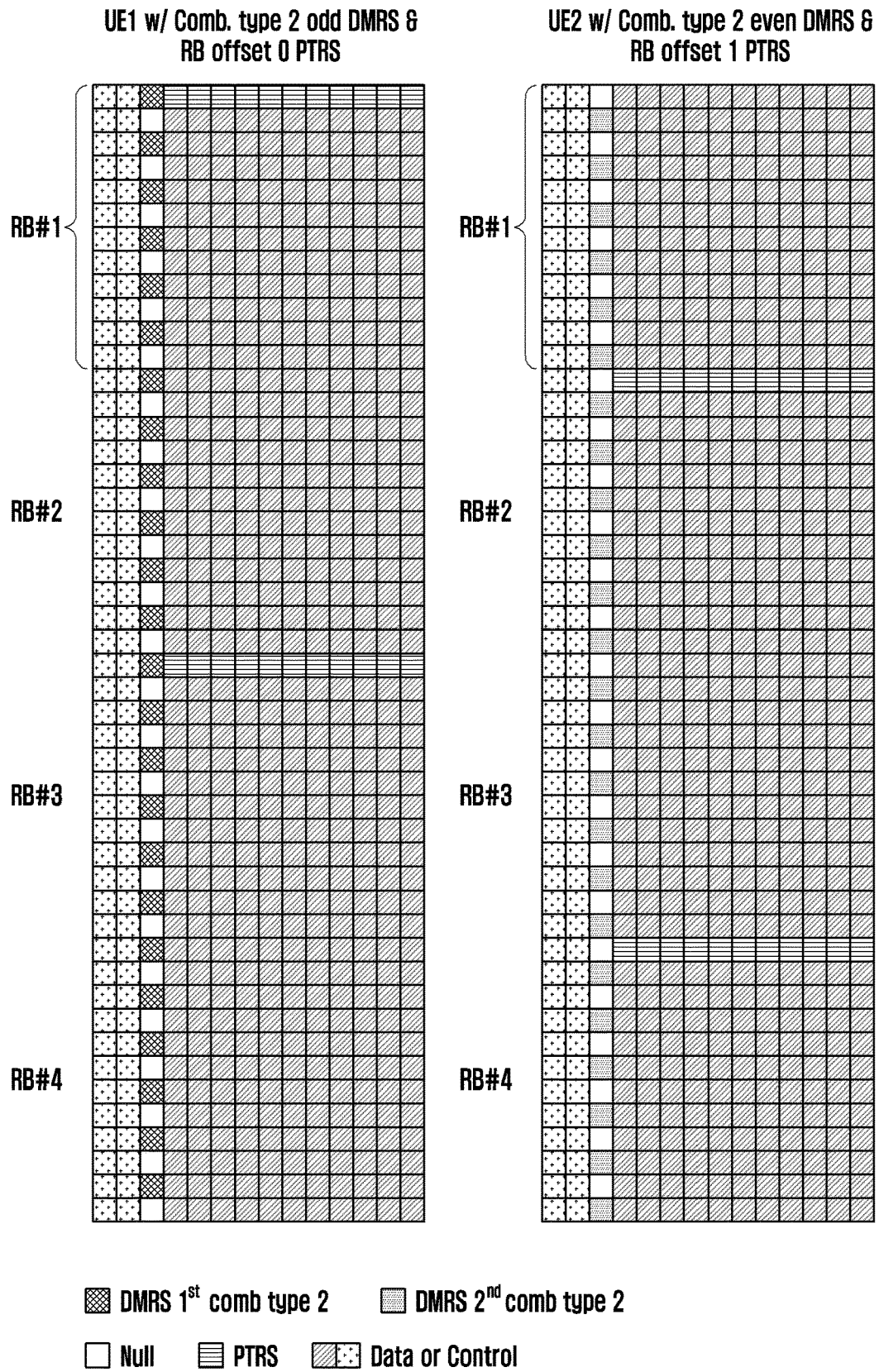
FIG. 10 illustrates a structure in which a DMRS port classified by comb type and a PTRS port are mapped in MU-MIMO transmission.

FIG. 10 illustrates a structure in which a DMRS port classified by comb type and a PTRS port are mapped in MU-MIMO transmission. It is assumed that a plurality of UEs can use one PTRS port per UE. FIG. 10 illustrates an embodiment in which a base station maps PTRS ports for two UEs to a DMRS port by changing an RB offset. Although not shown in FIG. 10, the base station may perform mapping by applying the same RB offset and different RE offsets. However, in MU-MIMO, even though mapping is performed by applying different RB offsets or RE offsets, PTRS and data symbol regions for UEs may overlap, and thus interference may occur.

In the MU-MIMO transmission, since interference occurs due to overlapping of PTRS and data symbols, performance deterioration in phase noise estimation using a PTRS or deterioration in data reception performance may occur. In SU-MIMO transmission, in order to maintain orthogonality between two layers so that interference does not occur, double PTRS resources may be required, thus increasing overhead. Further, in SU-MIMO, orthogonal allocation may also be impossible when transmitting a PTRS to multiple layers, such as two or more layers.

Hereinafter, a method for preventing the occurrence of interference without using more PTRS resources in MIMO transmission will be described. The method relates to a method for generating a sequence of a PTRS signal, and may include a process for signaling to UEs.

Figure 11A:
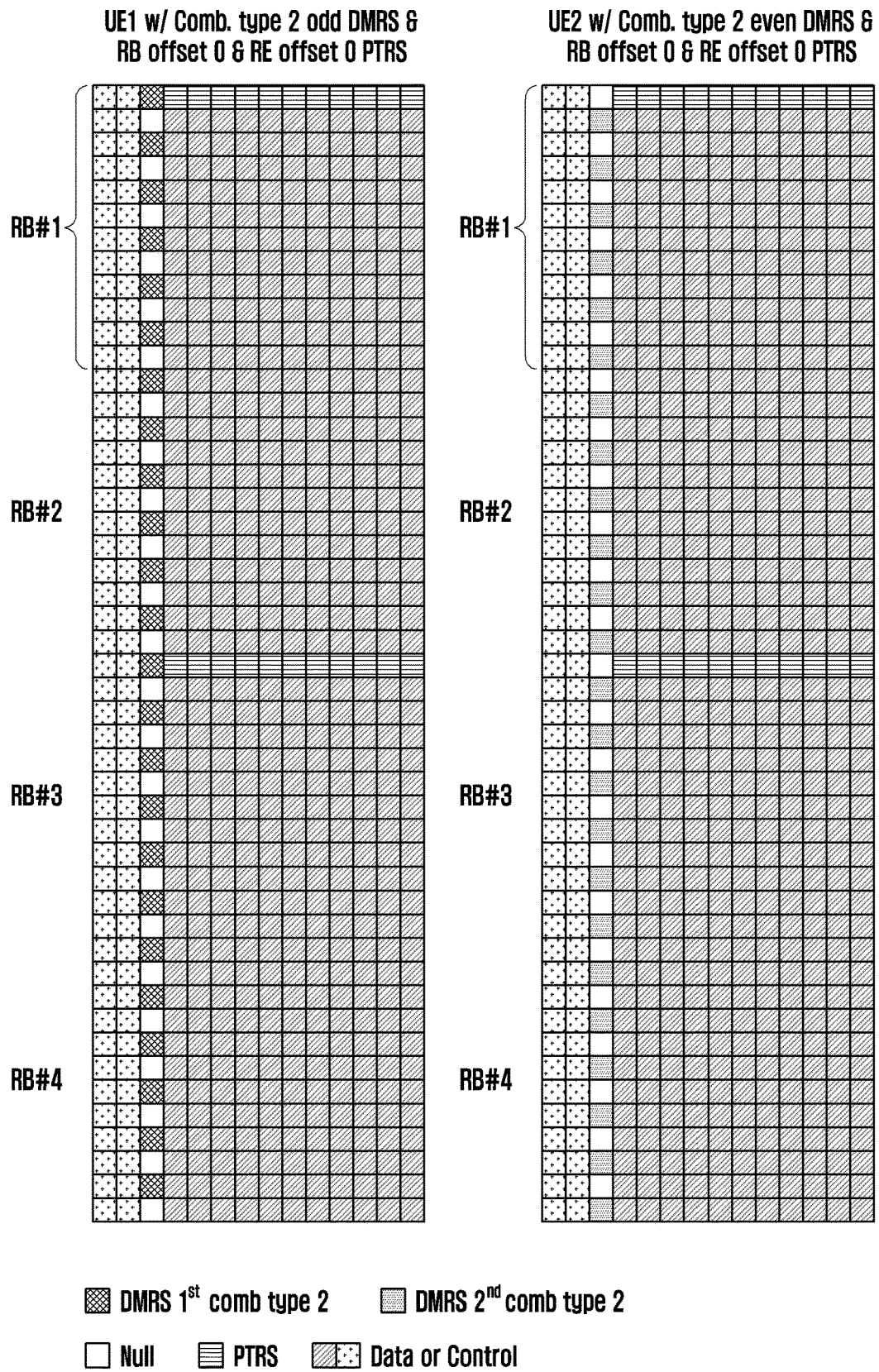
FIG. 11A illustrates a structure in which PTRS ports are allocated to the same resource in MIMO transmission according to an embodiment of the disclosure.

FIG. 11A illustrates a structure in which PTRS ports are allocated to the same resource in MIMO transmission according to an embodiment of the disclosure. According to the embodiment of FIG. 11A, resources may be allocated so that PTRS ports for two UEs or two layers overlap, or an RB/RE offset may not be configured. PTRSs may be allocated in a distributed manner as required, and one PTRS RE may be allocated every two RBs or every four RBs. In FIG. 11A, it is assumed that one PTRS RE is allocated every two RBs.

When different UEs or different layer groups transmit a PTRS at the same time, as shown in FIG. 10, the PTRSs may interfere with each other, thus deteriorating phase noise estimation performance for each UE or each DMRS port group. In order to solve this, the disclosure proposes a method for applying an orthogonal cover code (OCC) in the frequency domain to a PTRS.

Referring to the following equations, even when PTRS ports are allocated to the same resource in MIMO transmission from a transmitter to a receiver, the receiver can estimate phase noise without deteriorating performance. The following description is made assuming an uplink case (where a UE transmits a PTRS and a base station receives the PTRS), but may also be applied in a downlink case (where a base station transmits a PTRS and a UE receives the PTRS).

A reception signal of a PTRS allocated to a kth subcarrier at a specific symbol t may be expressed as follows.

$$y_k(t) = H_k^0(t)\phi_k^0(t)s_k^0(t) + n_k(t) \quad (1)$$

Here, H denotes a channel response coefficient, φ denotes phase noise, s denotes a PTRS sequence, and n denotes a noise signal. The superscript denotes PTRS port index 0, subscript k denotes a subcarrier index, and t denotes a symbol index. The embodiment of FIG. 10, in which two UEs simultaneously transmit a PTRS on the same resource, is expressed by the following equation.

$$y_k(t) = H_k^0(t)\phi_k^0(t)s_k^0(t) + H_k^1(t\_\phi_k^1(t)s_k^1(t) + n_k(t) \quad (2)$$

Here, it is assumed that PTRS port index 0 denotes a first UE and PTRS port index 1 denotes a second UE. Considering a two-tone OCC case in which an OCC is applied to PTRSs in different RBs, the following equations may be defined with respect to different subcarrier indexes k and k'.

$$y_k(t) = H_k^0(t)\phi_k^0(t)s_k^0(t) + H_k^1(t)\phi_k^1(t)s_k^1(t) + n_k(t) \quad (3)$$

$$y_{k'}(t) = H_{k'}^0(t)\phi_{k'}^0(t)s_{k'}^0(t) + H_{k'}^1(t)\phi_{k'}^1(t)s_{k'}^1(t) + n_{k'}(t) \quad (4)$$

To simplify the equations, the time index t may be omitted, and it may be assumed that [+1, +1] and [+1, −1] are applied to $S_k$ and $S_{k'}$ in an OCC of a PTRS sequence. Further, assuming that phase noises φ of different subcarriers remain the same without being changed in an observation period, the equations may be modified as follows.

$$y_k = H_k^0\phi_k^0 + H_k^1\phi_k^1 + n_k \quad (5)$$

$$y_{k'} = H_{k'}^0\phi_k^0 + H_{k'}^1\phi_k^1(-1) + n_{k'} \quad (6)$$

Here, the PTRS sequences are descrambled, and an FD-OCC is applied where PTRS port index 0 is [+1 +1] and PTRS port index 1 is [+1 −1]. The above two equations may be converted into the following equations by addition and subtraction.

$$y_k + y_{k'} = (H_k^0 + H_{k'}^0)\phi_k^0 + (H_k^1 - H_{k'}^1)\phi_k^1 + n_k + n_{k'} \quad (7)$$

$$y_k - y_{k'} = (H_k^0 - H_{k'}^0)\phi_k^0 + (H_k^1 + H_{k'}^1)\phi_k^1 + n_k - n_{k'} \quad (8)$$

The base station may use a channel value estimated using a DMRS signal associated with a PTRS in order to estimate phase noise. DMRS ports may be mapped to various types of DMRS patterns according to each DMRS configuration type illustrated in FIG. 2, and it is assumed that a channel response value $H_k^0$ $H_{k'}^0$ $H_k^1$ $H_{k'}^1$ in a subcarrier to which each PTRS is allocate is obtained through channel estimation. To simplify the equations, an error that occurs in channel estimation does not have an effect on describing the disclosure, and is thus omitted. The base station may multiply the estimated channel value and the reception signal in which the PTRS is allocated as follows, thereby obtaining an equation for deriving desired phase noise.

Equation 9
$$\text{phase noise \#0 } (k) = \frac{(H_k^0 + H_{k'}^0)^*}{|H_k^0 + H_{k'}^0|^2} \times (y_k + y_{k'})$$
$$= \varphi_k^0 + \frac{(H_k^{0*}H_k^1 - H_k^{0*}H_{k'}^1 + H_{k'}^{0*}H_k^1 - H_{k'}^{0*}H_{k'}^1)}{|H_k^0 + H_{k'}^0|^2}\varphi_k^1 + n_k'$$

Equation 10
$$\text{phase noise \#1 } (k) = \frac{(H_k^1 + H_{k'}^1)^*}{|H_k^1 + H_{k'}^1|^2} \times (y_k + y_{k'})$$
$$= \varphi_k^1 + \frac{(H_k^{1*}H_k^0 - H_k^{1*}H_{k'}^0 + H_{k'}^{1*}H_k^0 - H_{k'}^{1*}H_{k'}^0)}{|H_k^1 + H_{k'}^1|^2}\varphi_k^0 + n_k''$$

Here, and k denote the product of a noise component and a channel estimation weight, and are modeled to an average per-user additive white Gaussian noise (AWGN) assuming that the average power of a channel response is normalized to 1. The above equations represent two PTRSs which are spaced apart by two RBs and from which an OCC is removed, and may include remaining phase noise components of different UEs or different layer groups due to correlation between channels which the different UEs or different layer groups have, in addition to a desired phase noise component. Phase noise may have a low correlation between symbols in the time domain, and may have the same phase error between subcarriers in the frequency domain. This is a phenomenon that causes phase noise due to an error in the signal generation waveform of an oscillator. Therefore, when the oscillator is shaken and thus a signal waveform is distorted, all frequency distortion in a corresponding symbol period may occur in the same direction. That is, in OFDM, a signal $S_k$ of an arbitrary subcarrier k may be represented by $$S_k e^{-j\frac{2\pi(f_k + \Delta f)}{N}t}$$

due to a frequency error Δf, and frequency errors generated by the oscillator occur in the same direction (a single direction in which the frequency increases or decreases relative to a zero point) regardless of the subcarrier. Accordingly, phase noise due to the errors may also be caused by the same value of $$e^{-j\frac{2\pi\Delta f}{N}}$$

with respect to a corresponding subcarrier k in a scheduled BW.

Therefore, when estimating phase noise using a PTRS, the base station may generally use a method of accumulating PTRSs distributed over a plurality of RBs in the frequency domain to thereby more accurately estimate phase noise. In addition, when the above equations are averaged with respect to the plurality of RBs, a correlation between different UEs decreases due to an insignificant channel change or a significant channel change on a frequency axis, and thus an approximate phase noise estimation value may be obtained as follows.

$$E\{\text{phase noise \#0 }(k)\} = \quad \text{Equation 11}$$
$$\frac{1}{N}\sum_{k}^{N} \frac{(H_k^0 + H_{k'}^0)^*}{|H_k^0 + H_{k'}^0|^2} \times (y_k + y_{k'}) \approx \varphi_k^0$$

$$E\{\text{phase noise \#1 }(k)\} = \quad \text{Equation 12}$$
$$\frac{1}{N}\sum_{k}^{N} \frac{(H_k^1 + H_{k'}^1)^*}{|H_k^1 + H_{k'}^1|^2} \times (y_k - y_{k'}) \approx \varphi_k^1$$

The foregoing embodiment proposed in the disclosure illustrates a method for estimating phase noise when two PTRSs are transmitted in an overlapping manner, and overlapping two or more PTRSs may be applied in an extended manner by modifying an OCC. An OCC for PTRSs allocated in the frequency domain may be expanded by a power of 2 times in a combination of elements {+1, −1} in a Hadamard form. As an example of an OCC modification, an OCC with a length of 4 may form a sequence, such as [+1+1+1+1], [+1−1+1−1], [+1+1−1−1], and [+1 −1 −1 +1]. Since the length is 4, the base station may accumulate four PTRSs in the frequency domain to obtain orthogonal signals.

In addition to an OCC with a length of a power of 2, an OCC with a length of an arbitrary integer N may be orthogonally generated by rotating a phase by $2\pi/N$. For example, an OCC with a length of 3 may be generated and used as a sequence, such as $$[1, 1, 1], \left[1, \ e^{j\frac{2\pi}{3}}, \ e^{j\frac{4\pi}{3}}\right], \text{ or } \left[1, \ e^{j\frac{4\pi}{3}}, \ e^{j\frac{2\pi}{3}}\right].$$

Further, when phase rotation is applied to the same OCC with a length of 4, a sequence, such as $$[1, 1, 1, 1], \left[1, \ e^{j\frac{2\pi}{4}}, \ e^{j\frac{4\pi}{4}}, \ e^{j\frac{6\pi}{4}}\right],$$
$$\left[1, \ e^{j\frac{4\pi}{4}}, \ e^{j\frac{8\pi}{4}}, \ e^{j\frac{12\pi}{4}}\right], \text{ or } \left[1, \ e^{j\frac{6\pi}{4}}, \ e^{j\frac{12\pi}{4}}, \ e^{j\frac{18\pi}{4}}\right]$$

may be generated and used. A PTRS signal may be generated as a pseudo-random Gold sequence.

Proposed below is a method for multiple allocation of two or more PTRSs in the form of a time-domain OCC between chunk blocks for a PTRS according to DFT-s-OFDM, in addition to an FD-OCC applied to CP-OFDM.

As illustrated in FIG. 5B and FIG. 6, in DFT-s-OFDM, a PTRS according to pre-DFT may be transmitted, and a transmitter may transmit a PTRS via a sample group called a chunk block. Pre-DFT resource allocation is a method of puncturing some data samples in the time domain and inserting a PTRS sequence thereinto. Then, the sequence is transmitted via DFT, and thus the PTRS is transmitted across a scheduled BW in the frequency domain. Therefore, in a PTRS of DFT-s-OFDM, a resource cannot be separated in the frequency domain, as in CP-OFDM, and thus the transmitter cannot apply an FD OCC. However, since there is a plurality of chunk blocks (groups) and a plurality PTRS sample signals is allocated in the chunk blocks, the transmitter may be able to apply a time-domain (TD) OCC.

In FIG. 7, the number of chunk blocks may be configured to be 2, 4, or 8, and the number of samples (PTRS) in each chunk block may be 2 or 4. Therefore, the transmitter may apply orthogonal OCCs between two, four, or eight chunk blocks. In a different method, the transmitter may apply an OCC with a length of 2 or 4 between samples in a chunk block.

Since phase noise is assumed to stay at a similar level without significantly changing within OFDM symbols, it is possible to apply an OCC within a chunk block or between chunk blocks. Further, in order to simultaneously allocate a plurality of PTRSs to the same resource, the transmitter may apply an OCC in consideration of a chunk block and internal samples as one orthogonal sequence to increase the number of orthogonal codes. Therefore, according to an embodiment of the disclosure, the following various TD-OCCs may be applied according to a PTRS configuration.

It may be assumed that a plurality of chunk blocks (groups) and a plurality of sample signals in each block (group) are allocated to a PTRS. At least one method may be applied among a method in which a transmitter assigns an orthogonal code between a chunk block, a method in which a transmitter assigns an orthogonal code between sample signals in a chunk block, or a method in which a transmitter groups a plurality of chunk blocks and assigns an orthogonal code by combining samples belonging to the blocks.

Figure 11B:
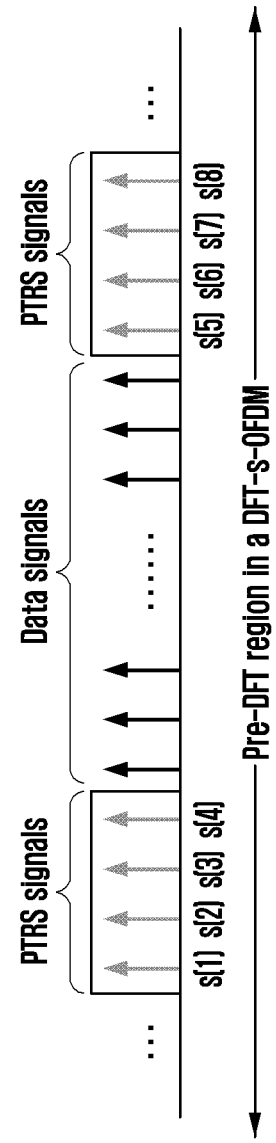
FIG. 11B, FIG. 11C, and FIG. 11D illustrate an OCC application method in DFT-s-OFDM according to an embodiment of the disclosure.
Figure 11C:
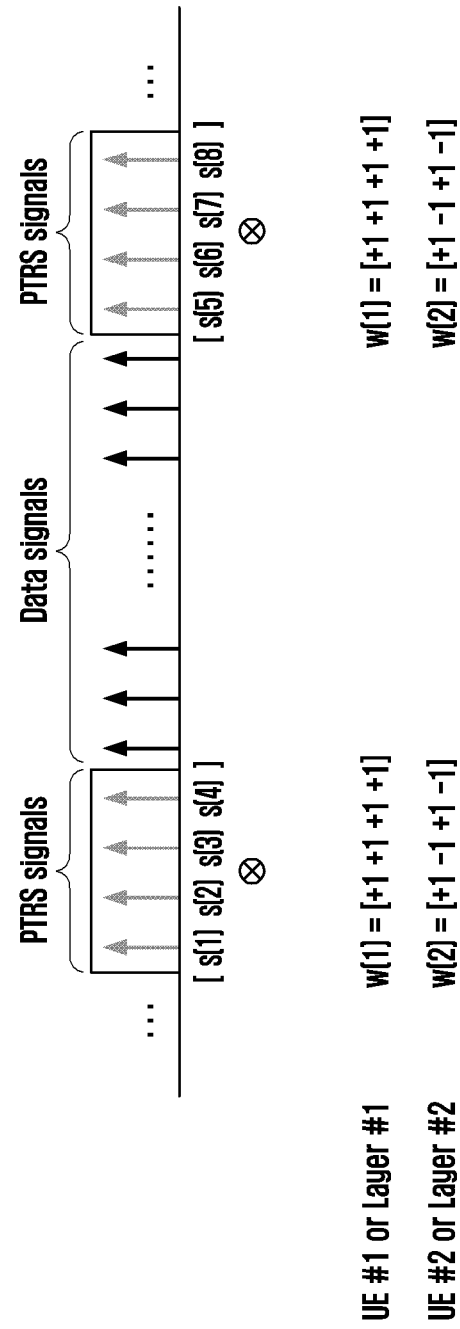
Figure 11D:
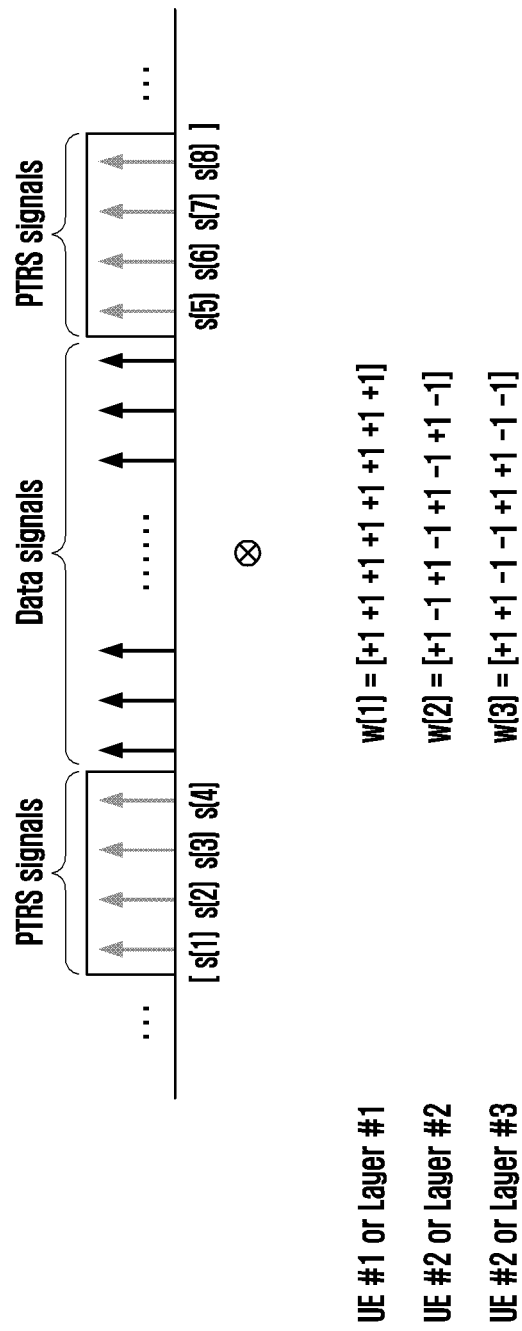

FIG. 11B, FIG. 11C, and FIG. 11D illustrate an OCC application method in DFT-s-OFDM according to an embodiment of the disclosure. Assuming that the number of PTRS chunk blocks is 2 and the block size is 4, the OCC application method in DFT-s-OFDM is described as follows.

FIG. 11B illustrates a method for assigning an orthogonal code between chunk blocks.

The method for assigning the orthogonal code between the chunk blocks is applying an OCC to a first block and a second block, and thus the OCC may be applied to each UE or each layer per block. When the OCC is represented by w={w(1), w(2)}, an OCC with a length of 2 may be represented by w(1)=[+1+1] and w(2)=[+1−1]. The bold type refers to a sequence or a sequence set.

When w(1) is adopted as the OCC, a PTRS transmission signal of UE #1 or layer #1 to which the OCC is applied may be such that a first block is (+1)*[s(1) s(2) s(3) s(4)]=[s(1) s(2) s(3) s(4)] and a second block is (+1)*[s(5) s(6) s(7) s(8)]=[s(5) s(6) s(7) s(8)]. When w(2) is adopted as the OCC, a PTRS transmission signal of UE #2 or layer #2 may be such that a first block is (+1)*[s(1) s(2) s(3) s(4)]=[s(1) s(2) s(3) s(4)] and a second block is (−1)*[s(5) s(6) s(7) s(8)]=[−s(5)−s(6)−s(7)−s(8)]. In addition, different sequences may be allocated to a PTRS sequence s of each UE or each layer.

FIG. 11C illustrates a method for assigning an orthogonal code between sample signals in a chunk block.

In the method for assigning the orthogonal code between the sample signals (PTRSs) in the chunk block, since there are four PTRS samples in each block, two OCCs may be selected from among OCCs having a length of 4 and may be applied to two UEs or two layers. For example, among w={w(1), w(2), w(3), w(4)}={[+1+1+1+1], [+1−1+1−1], [+1+1−1−1], [+1−1−1+1]}, first two w(1) and w(2) may be selected and applied to each UE or each layer. In this case, a PTRS transmission signal of UE #1 or layer #1 may be such that a first block is [+1+1+1+1]⊗[s(1) s(2) s(3) s(4)]=[s(1) s(2) s(3) s(4)] and a second block is [+1+1+1+1]⊗[s(5) s(6) s(7) s(8)]=[s(5) s(6) s(7) s(8)], and a PTRS transmission signal of UE #2 or layer #2 may be such that a first block is [+1−1 +1−1]⊗[s(1) s(2) s(3) s(4)]=[s(1)−s(2) s(3)−s(4)] and a second block is [+1−1+1−1]⊗[s(5) s(6) s(7) s(8)]=[s(5)−s(6) s(7)−s(8)]. Here, ⊗ denotes element-by-element multiplication.

In addition, the method of FIG. 11C may be applied to four UEs or four layers. In the above case, four orthogonal sequences may be generated and transmitted by differently applying the four OCCs to PTRS signals in blocks for each UE or each layer.

FIG. 11D illustrates a method for grouping a plurality of chunk blocks and assigning an orthogonal code by combining samples belonging to the blocks.

In the method of grouping the plurality of chunk blocks and assigning the orthogonal code by combining the samples (=PTRSs) belonging to the blocks, since two chunk blocks are grouped, an OCC having a total length of 8 may be applied. When the OCC is generated as a Hadamard sequence, the OCC having the length of 8 may be w={w(1), w(2), w(3), w(4), w(5), w(6), w(7), w(8)}={[+1+1+1+1+1+1+1+1], [+1−1+1−1+1−1+1−1], [+1−1−1+1+1−1−1+1], [+1+1+1+1−1−1−1−1], [+1−1+1−1−1+1−1+1], [+1−1−1−1−1−1+1+1], [+1+1+1−1−1−1−1+1], [+1−1−1+1−1+1+1−1]}. Orthogonal sequences may be generated by multiplying PTRSs by as many OCCs as the number of UEs or layers among the eight OCCs in an element-by-element manner.

For example, the first three w(1), w(2), w(3) may be selected and applied to three UEs or three layers. In this case, a PTRS transmission signal of UE #1 or layer #1 may be [+1+1+1+1+1+1+1+1]⊗([s(1) s(2) s(3) s(4) s(5) s(6) s(7) s(8)]=[s(1) s(2) s(3) s(4) s(5) s(6) s(7) s(8)], a PTRS transmission signal of UE #2 or layer #2 may be [+1−1+1−1+1−1+1−1]⊗[s(1) s(2) s(3) s(4) s(5) s(6) s(7) s(8)]=[s(1)−s(2) s(3)−s(4) s(5)−s(6) s(7)−s(8)], and a PTRS transmission signal of UE #3 or layer #3 may be [+1+1−1−1+1+1−1−1]⊗[s(1) s(2) s(3) s(4) s(5) s(6) s(7) s(8)]=[s(1) s(2)−s(3)−s(4) s(5) s(6)−s(7)−s(8)].

Further, in the method of FIG. 11D, since there are a total of eight OCC sets, orthogonal transmission may be possible for up to eight UEs or eight layers.

Considering the PTRS pattern of FIG. 3, an OCC having a length of 2 or 4 may be applied between samples in a chunk block, and an OCC having a length of 2, 4, or 8 may be applied between chunk blocks. In addition, by extending an application range, an OCC having a length of 4, 8, 16, or 32 (i.e., the number of samples belonging to a plurality of chunk blocks is the length of an OCC) may be applied between samples in a plurality of chunk blocks (in FIG. 6, assuming that the number of chunk blocks is 2 and the block size is 2, the length of an OCC is 4, which is the number of samples, and thus an OCC having a length of 4 may be applied to the four samples (PTRSs)). As an OCC, a Hadamard sequence may be applied, as in the example of CP-OFDM, or an orthogonal phase-rotated form may be generated.

Figure 12:
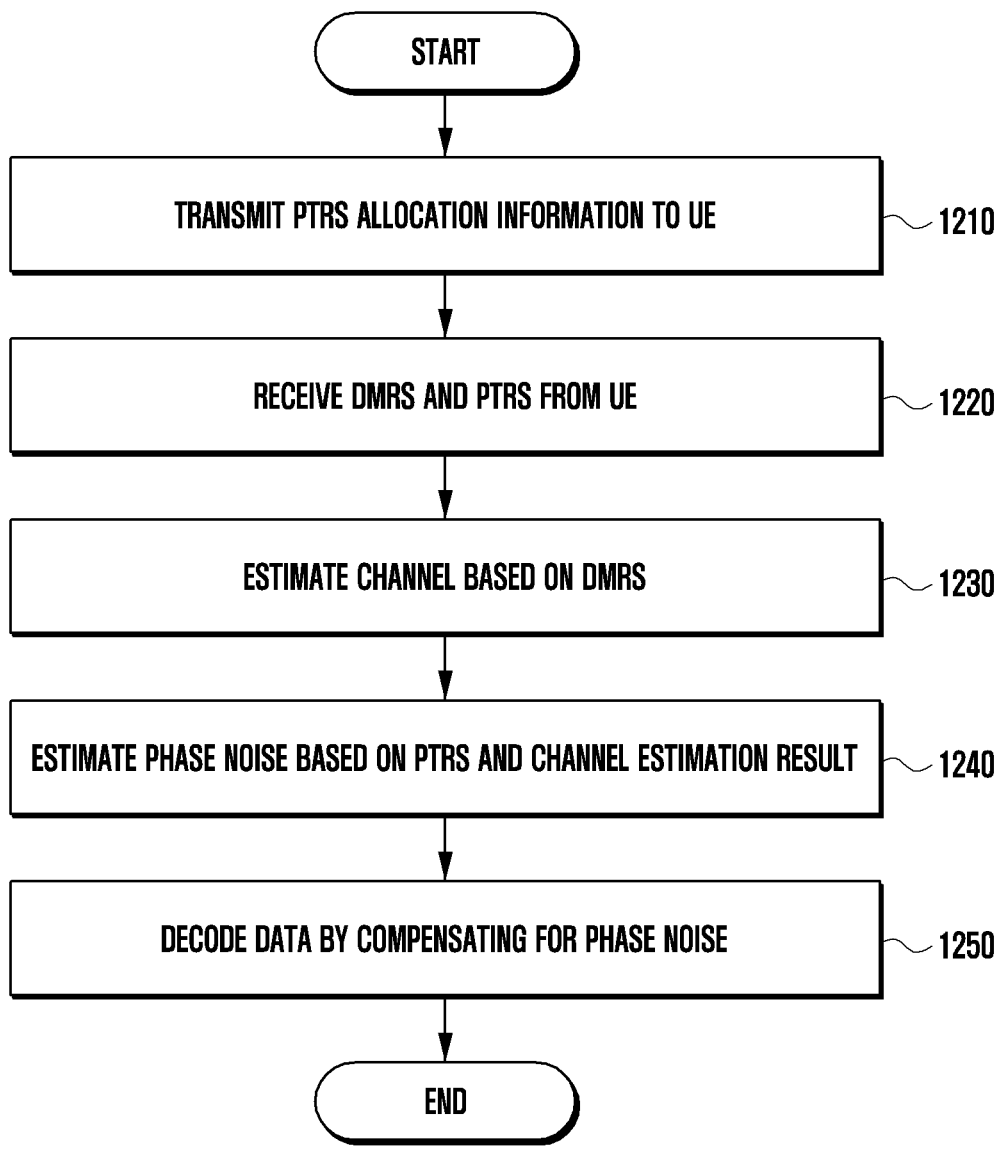
FIG. 12 is a flowchart illustrating a method for decoding uplink data by compensating for phase noise according to an embodiment of the disclosure.

FIG. 12 is a flowchart illustrating a method for decoding uplink data by compensating for phase noise according to an embodiment of the disclosure.

Operation according to the disclosure will be briefly described below. First, a base station may transmit allocation information about a PTRS transmitted by a UE to the UE in order to estimate phase noise. The base station may receive a DMRS and a PTRS transmitted by the UE receiving the allocation information. The base station may estimate an uplink channel based on the DMRS and may estimate phase noise based on the estimation result and the received PTRS. The base station may decode data by compensating for the phase noise.

Not every operation of FIG. 12 is necessarily required, and some operations may be omitted. Operation according to the disclosure will be described in detail with reference to FIG. 12.

In operation S1210, the base station may transmit PTRS allocation information to the UE. The PTRS allocation information may include information about a PTRS port, time/frequency density, a pattern, an OCC, and resource assignment. The base station may configure the PTRS allocation information such that PTRS ports are allocated to the same resource in MIMO transmission, as shown in FIG. 11A, and the UE applies an OCC. The base station may transmit the allocation information to the UE through RRC.

When two or more PTRSs overlap, the base station may configure the PTRS allocation information by modifying an OCC code. CP-OFDM and DFT-s-OFDM may be used as an uplink multiple access scheme.

When the multiple access scheme is CP-OFDM, the base station may configure an OCC that the UE applies to a PTRS in the frequency domain as at least one of a code to which a Hadamard sequence is applied or a code to which orthogonal phase rotation is applied. When the multiple access scheme is DFT-s-OFDM, the base station may configure an OCC that the UE applies to a PTRS in the time domain as at least one of a code to which a Hadamard sequence is applied or a code to which orthogonal phase rotation is applied. The modified OCC application method may correspond to the description of FIG. 11A.

In operation S1220, the base station may receive a DMRS and a PTRS from the UE. The UE applies an OCC to the PTRS according to the PTRS allocation information and transmits the PTRS to the base station according to the resource assignment. The base station may receive the DMRS to estimate a reception channel of the base station.

In operation S1230, the base station may perform channel estimation based on the received DMRS. The base station may perform channel estimation by receiving a DMRS mapped according to each DMRS configuration type, and may obtain a channel response value in a subcarrier to which each PTRS is allocated.

In operation S1240, the base station may estimate phase noise based on the result of estimating the reception channel of the base station and the PTRS. The specific method for estimating phase noise may correspond to the descriptions according to FIG. 11A and Equations 1 to 12.

In operation S1250, the base station may decode uplink data by compensating for the phase noise.

Figure 13:
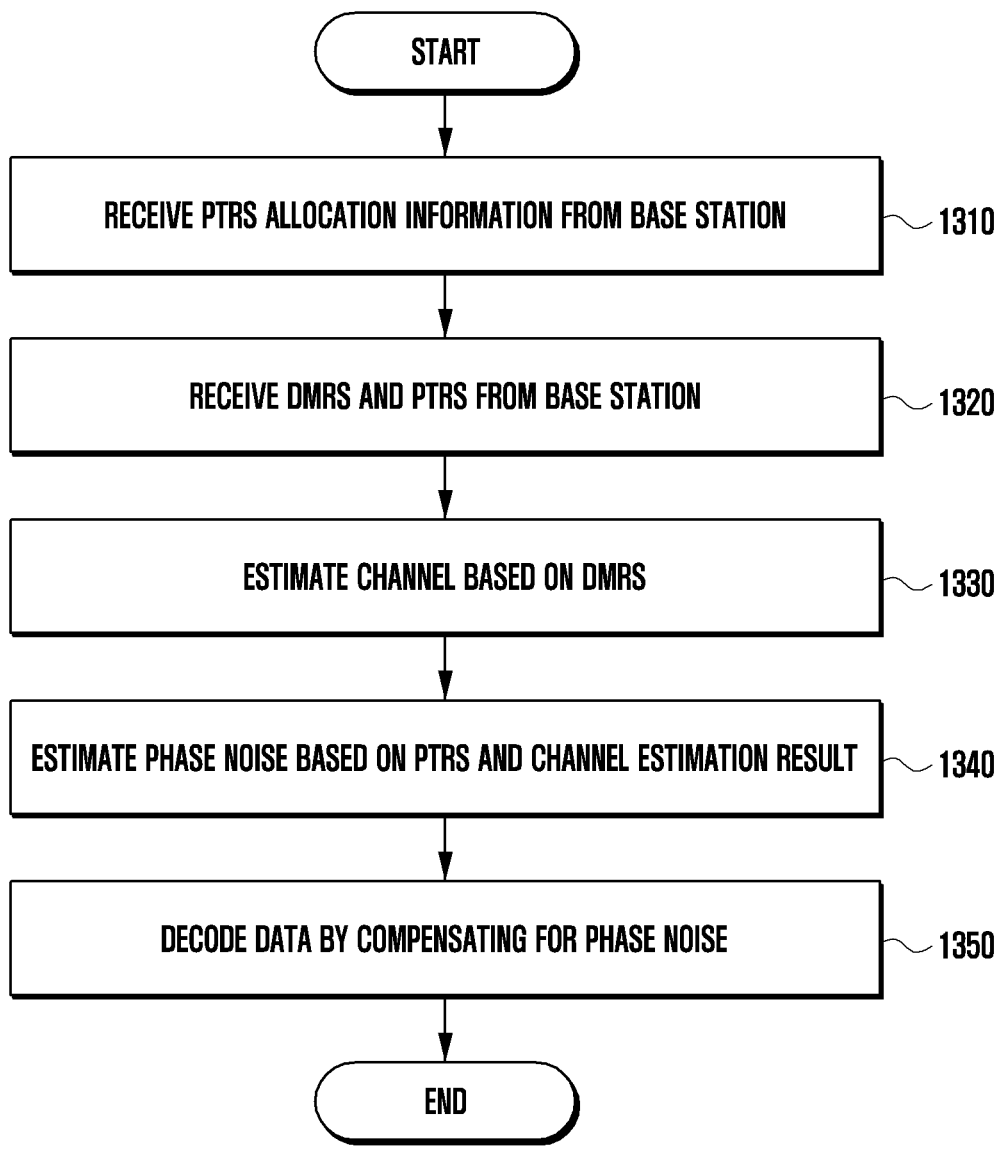
FIG. 13 is a flowchart illustrating a method for decoding downlink data by compensating for phase noise according to an embodiment of the disclosure.

FIG. 13 is a flowchart illustrating a method for decoding downlink data by compensating for phase noise according to an embodiment of the disclosure.

An operation according to the disclosure will be briefly described as follows. A UE may receive PTRS allocation information from a base station. The UE may receive a PTRS from the base station according to the PTRS allocation information, and may also receive a DMRS. The UE may estimate a reception channel of the UE based on the received DMRS, and may estimate phase noise based on the estimation result and the received PTRS. The UE may decode data by compensating for the phase noise.

The downlink data decoding method of FIG. 13 may correspond to the uplink data decoding method of FIG. 12. Specifically, in the data decoding methods of FIG. 12 and FIG. 13, the PTRS allocation information may be configured by the base station. However, the uplink data decoding method of FIG. 12 is different from the downlink data decoding method of FIG. 13 in that the entity that receives a PTRS or the like and estimates phase noise is the base station in FIG. 12, but the entity that receives a PTRS or the like and estimates phase noise is the UE in FIG. 13. That is, different entities may estimate phase noise, while corresponding methods for applying an OCC to a PTRS and corresponding methods for estimating phase noise may be used. Each operation of FIG. 13 is not necessarily required, and some operations may be omitted.

In operation S1310, the UE may receive PTRS allocation information from the base station. The PTRS allocation information is configured by the base station, and may include information about a port for a PTRS to be received by the UE, time/frequency density, a pattern, an OCC, and resource assignment. The PTRS allocation information configured by the base station may correspond to operation S1210 of FIG. 12.

In operation S1320, the UE may receive a DMRS and a PTRS from the base station. The UE may receive a PTRS which is allocated by the base station to the same resource in MIMO transmission, as shown in FIG. 11A, and to which an OCC is applied. The method whereby the UE receives the DMRS and the PTRS may correspond to operation S1220 of FIG. 12.

In operation S1330, the UE may perform channel estimation based on the received DMRS. The method for estimating a reception channel of the UE may correspond to operation S1230 of FIG. 12.

In operation S1340, the UE may estimate phase noise based on the result of estimating the reception channel of the UE and the PTRS. The method whereby the UE estimates the phase noise may correspond to operation S1240 of FIG. 12.

In operation S1350, the UE may decode downlink data by compensating for the phase noise.

Figure 14:
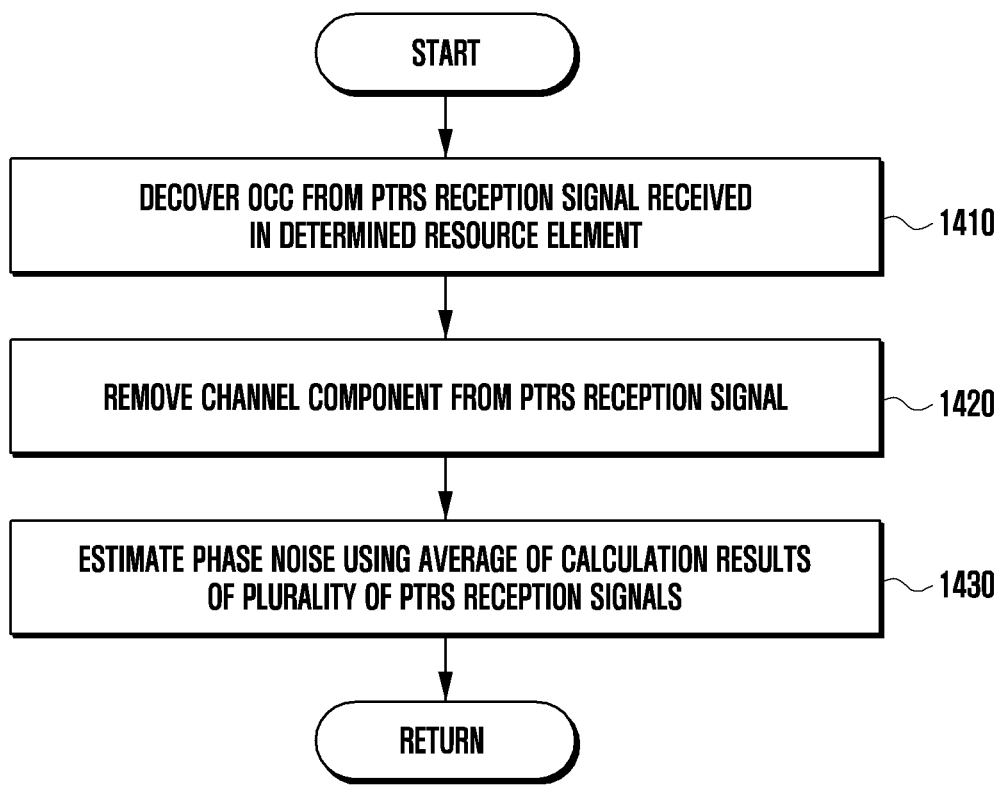
FIG. 14 is a flowchart illustrating a phase noise estimation method according to an embodiment of the disclosure.

FIG. 14 is a flowchart illustrating a phase noise estimation method according to an embodiment of the disclosure.

An operation according to the disclosure will be briefly described as follows. First, in an uplink, a base station may decover an OCC from a PTRS reception signal received in a specified resource element. The base station may remove a channel component by multiplying the decovered PTRS reception signal by a reception channel estimation value. The base station may obtain an approximate phase noise estimation value using the average of results of performing an operation on a plurality of PTRS reception signals distributed in a plurality of RBs.

In a downlink, an operation the same as that in the uplink may be performed, except that the entity to estimate phase noise is changed from a base station to a UE. Therefore, a method for the uplink is illustrated below, and may be a method for estimating phase noise in the downlink when the entity estimating phase noise is changed from a base station to a UE.

The phase noise estimation method of FIG. 14 is a specific example of operation S1240 of FIG. 12 and operation S1340 of FIG. 13. Each operation of FIG. 14 is not necessarily required, and some operations may be omitted. The operation according to the disclosure will be described in detail with reference to FIG. 14.

In operation S1410, the base station may decover an OCC from a PTRS reception signal received in a specified resource element. A PTRS to which the OCC is applied by a UE receiving PTRS allocation information transmitted by the base station may be transmitted via the PTRS reception signal. The base station may perform decovering of removing the OCC from the reception signal.

For example, assuming that two UEs simultaneously transmit a PTRS on the same resource, the base station may perform decovering by performing addition and subtraction on PTRS reception signals received in kth and k'th subcarriers. The decovering performed by the base station may correspond to Equation 7 and Equation 8.

In operation S1420, the base station may remove a channel component from the decovered PTRS reception signal. Since the PTRS reception signal includes the channel component, the base station may remove the channel component using a channel estimation value. The channel estimation value may refer to a channel response value in the subcarrier to which the PTRS is allocated.

The method whereby the base station removes the channel component may correspond to Equation 9 and Equation 10. Further, when the channel component is removed from the decovered PTRS reception signal, phase noise may be derived.

In operation S1430, the base station may estimate phase noise using the average of the calculation results of a plurality of PTRS reception signals distributed in a plurality of RBs. Since phase noise may have a low correlation between symbols in the time domain and may have the same phase error between subcarriers in the frequency domain, the base station may more accurately estimate phase noise by accumulating the calculation result of the PTRS reception signals distributed in the plurality of RBs. The method whereby the base station uses the average of the calculation results of the plurality of PTRS reception signals may be described by Equation 11 and Equation 12.

Figure 15:
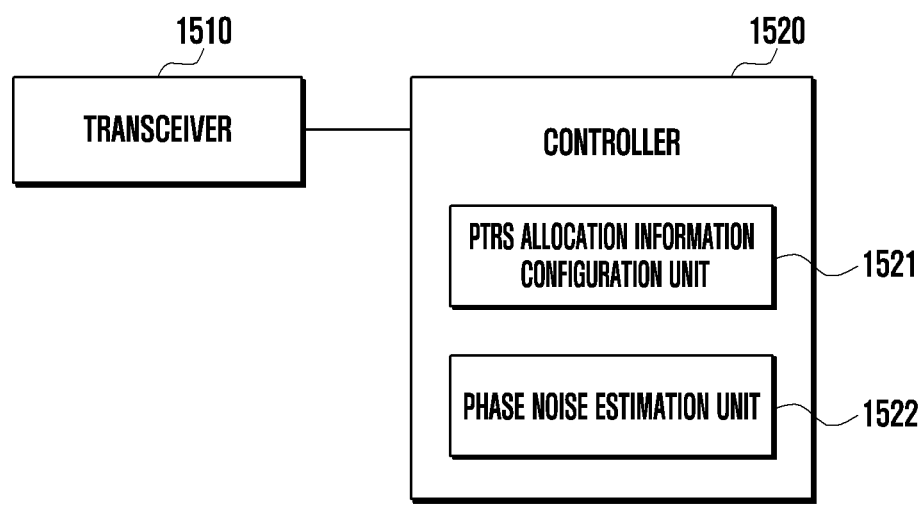
FIG. 15 is a block diagram illustrating the internal structure of a base station according to an embodiment of the disclosure.

FIG. 15 is a block diagram illustrating the internal structure of a base station according to an embodiment of the disclosure. As illustrated in FIG. 15, the base station of the disclosure may include a transceiver 1410 and a controller 1520.

The transceiver 1510 of the base station may perform message transmission and reception between the base station and a UE. To this end, the transceiver 1510 may include a wired or wireless interface.

The controller 1520 of the base station may control the overall operation of the base station. In uplink data decoding, the controller 1520 may transmit PTRS allocation information including phase tracking reference signal (PTRS) port information and orthogonal cover code (OCC) information to the UE, and may receive a demodulation reference signal (DMRS) and a PTRS from the UE. The controller 1520 may estimate a reception channel of the base station based on the DMRS, and may estimate phase noise based on the PTRS and the result of estimating the reception channel. The controller 1520 may decode data received from the UE by compensating for the phase noise.

In downlink data decoding, the controller 1520 may apply an OCC to a PTRS in the frequency domain and may transmit PTRS allocation information including port information about the PTRS and OCC information to the UE through the transceiver 1510. The controller 1520 may apply the OCC to the PTRS based on at least one of the length or phase of the OCC. When two or more PTRSs overlap at the position of the same resource of different layers, the controller 1520 may apply at least one of a Hadamard sequence and orthogonal phase rotation to the OCC.

To this end, the controller 1520 may further include a PTRS allocation information configuration unit 1521 to apply an OCC to a PTRS in at least one of the frequency domain and the time domain based on orthogonal frequency-division multiplexing (OFDM) and a phase noise estimation unit 1522 to estimate the reception channel of the base station based on the DMRS, to perform a specific operation on the PTRSs, which are received on the same resource between a plurality of layers and to which the OCC is applied by the UE, based on the result of estimating the reception channel of the base station, and to estimate phase noise using the average of calculation results of the PTRSs distributed in a plurality of resource blocks (RBs). These components may not be essential, and any individual component may be omitted.

The PTRS allocation information configuration unit 1521 may configure PTRS allocation information to be transmitted to the UE. In uplink data decoding, the PTRS allocation information configuration unit 1521 may configure the PTRS allocation information so that the UE applies an OCC to a PTRS transmitted to the base station. The configuration method may correspond to operation S1210 of FIG. 12. In downlink data decoding, the PTRS allocation information configuration unit 1521 may configure the PTRS allocation information so as to include information about an OCC applied to a PTRS transmitted to the UE. The configuration method may correspond to operation S1310 of FIG. 13.

The phase noise estimation unit 1522 may make an approximate estimate of phase noise based on a channel estimation result of the base station and a PTRS. The phase noise estimation method may correspond to operation S1240 of FIG. 12.

Figure 16:
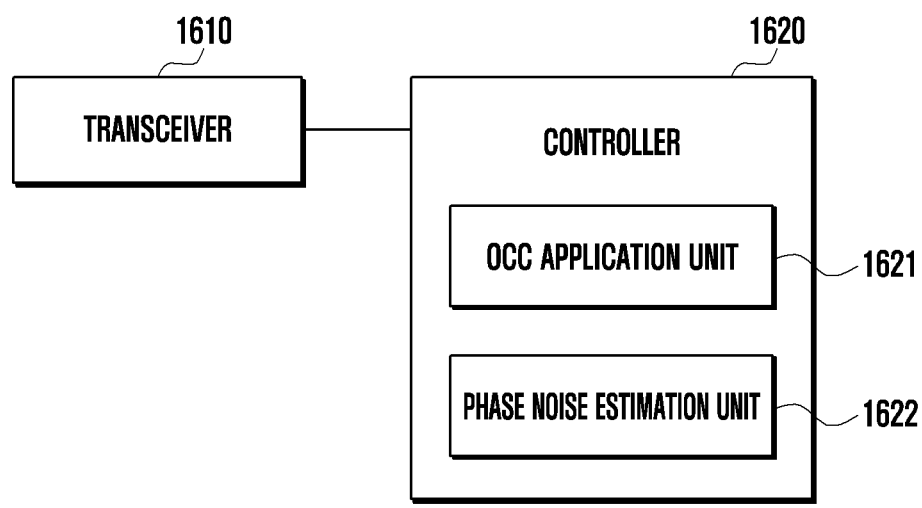
FIG. 16 is a block diagram illustrating the internal structure of a UE according to an embodiment of the disclosure.

FIG. 16 is a block diagram illustrating the internal structure of a UE according to an embodiment of the disclosure. As illustrated in FIG. 16, the UE of the disclosure may include a transceiver 1610 and a controller 1620.

The transceiver 1610 of the UE may perform message transmission and reception between a base station and the UE. To this end, the transceiver 1610 may include a wired or wireless interface.

The controller 1620 of the UE may control the overall operation of the base station. In uplink data decoding, the controller 1620 may apply an OCC to a PTRS to be transmitted to the base station based on PTRS allocation information received from the base station and may transmit the PTRS to the base station through the transceiver 1510. The controller 1620 may apply the OCC to the PTRS based on at least one of the length or the phase of the OCC. When two or more PTRSs overlap at the position of the same resource in different layers, the controller 1620 may apply at least one of a Hadamard sequence and orthogonal phase rotation to the OCC.

In downlink data decoding, the controller 1620 may receive PTRS allocation information including phase tracking reference signal (PTRS) port information and orthogonal cover code (OCC) information from the base station, and may receive a demodulation reference signal (DMRS) and a PTRS from the base station. The controller 1620 may estimate a reception channel of the UE based on the DMRS, and may estimate phase noise based on the PTRS and the result of estimating the reception channel. The controller 1620 may decode data received from the base station by compensating for the phase noise.

To this end, the controller 1620 may further include an OCC application unit 1621 to apply an OCC to a PTRS for uplink data decoding and a phase noise estimation unit 1622 to estimate the reception channel of the base station based on the DMRS, to perform a specific operation on the PTRSs, which are received on the same resource between a plurality of layers and to which the OCC is applied by the UE, based on the result of estimating the reception channel of the UE, and to estimate phase noise using the average of calculation results of the PTRSs distributed in a plurality of resource blocks (RBs). These components may not be essential, and each component may be omitted.

The OCC application unit 1621 may apply an OCC to a PTRS to be transmitted to the base station. The OCC application unit 1621 may apply an OCC to a PTRS only in uplink data decoding, and may omit applying an OCC to a PTRS in downlink data decoding. The OCC application unit 1621 may apply an OCC to a PTRS in at least one of the frequency domain and the time domain based on orthogonal frequency-division multiplexing (OFDM).

The phase noise estimation unit 1622 may estimate an approximate value of phase noise based on a channel estimation result of the base station and a PTRS. The phase noise estimation method may correspond to operation S1340 of FIG. 13.

The embodiments of the disclosure described and shown in the specification and the drawings have been presented to easily explain the technical contents of the disclosure and help understanding of the disclosure, and are not intended to limit the scope of the disclosure. It will be apparent to those skilled in the art that, in addition to the embodiments disclosed herein, other variant embodiments may be implemented on the basis of the technical idea of the disclosure.

The invention claimed is:

1. An uplink data decoding method of a base station in a wireless communication system, the method comprising:
   transmitting, to a user equipment (UE), phase tracking reference signal (PTRS) allocation information including PTRS port information and orthogonal cover code (OCC) information;
   receiving, from the UE, a demodulation reference signal (DMRS) and a PTRS to which an OCC is applied according to the OCC information;
   estimating a phase noise based on the DMRS and the PTRS; and
   decoding a data received from the UE by compensating for the phase noise,
   wherein the OCC information is configured such that:
      the OCC is applied to the PTRS in at least one of a frequency domain and a time domain based on orthogonal frequency-division multiplexing (OFDM),
      the OCC is applied to the PTRS based on at least one of a length or a phase of the OCC in case that the OCC is applied to the PTRS according to cyclic prefix orthogonal frequency-division multiplexing (CP-OFDM) in the frequency domain, and
      the OCC is applied to chunk blocks by applying the same OCC to PTRS allocated in the same chunk block of discrete Fourier transform spread orthogonal frequency-division multiplexing (DFT-s-OFDM) or the OCC is applied to grouped PTRSs by grouping PTRSs belonging to a plurality of chunk blocks in case that the OCC is applied to the PTRS according to DFT-s-OFDM in the time domain.

2. The method as claimed in claim 1, wherein the estimating of the phase noise comprises:
  estimating a reception channel of the base station based on the DMRS;
  uncovering the OCC from a PTRS reception signal received in a predetermined resource element;
  removing a channel component from the uncovered PTRS reception signal; and
  estimating the phase noise using an average of calculation results of a plurality of PTRS reception signals distributed in a plurality of resource blocks (RBs).

3. A downlink data decoding method of a user equipment (UE) in a wireless communication system, the method comprising:
  receiving, from a base station, phase tracking reference signal (PTRS) allocation information including PTRS port information and orthogonal cover code (OCC) information in a frequency domain;
  receiving, from the base station, a demodulation reference signal (DMRS) and a PTRS to which an OCC is applied according to the OCC information;
  estimating a phase noise based on the DMRS and the PTRS; and
  decoding a data received from the base station by compensating for the phase noise,
  wherein the OCC information is configured such that:
    the OCC is applied to the PTRS in the frequency domain, and
    the OCC is applied to the PTRS based on at least one of a length or a phase of the OCC in case that the OCC is applied to the PTRS according to cyclic prefix orthogonal frequency-division multiplexing (CP-OFDM) in the frequency domain.

4. The method as claimed in claim 3, wherein the estimating of the phase noise comprises:
  estimating a reception channel of the UE based on the DMRS;
  uncovering the OCC from a PTRS reception signal received in a predetermined resource element;
  removing a channel component from the uncovered PTRS reception signal; and
  estimating the phase noise using an average of calculation results of a plurality of PTRS reception signals distributed in a plurality of resource blocks (RBs).

5. A base station for decoding uplink data in a wireless communication system, the base station comprising:
  a transceiver configured to transmit and receive a signal; and
  a controller configured to transmit, to a user equipment (UE), phase tracking reference signal (PTRS) allocation information comprising PTRS port information and orthogonal cover code (OCC) information, to receive, from the UE, a demodulation reference signal (DMRS) and a PTRS to which an OCC is applied according to the OCC information, to estimate a phase noise based on the DMRS and the PTRS, and to decode a data received from the UE by compensating for the phase noise,
  wherein the controller comprises a PTRS allocation information configuration unit configured to apply the OCC to the PTRS in at least one of a frequency domain and a time domain based on orthogonal frequency-division multiplexing (OFDM), and
  wherein the PTRS allocation information configuration unit applies the OCC to the PTRS based on at least one of a length or phase of the OCC in case that the OCC is applied to the PTRS according to cyclic prefix orthogonal frequency-division multiplexing (CP-OFDM) in the frequency domain, and applies the OCC to the PTRS based on at least one of a length or a phase of the OCC in case that the OCC is applied to the PTRS according to cyclic prefix orthogonal frequency-division multiplexing (CP-OFDM) in the frequency domain.

6. The base station as claimed in claim 5, wherein the controller comprises a phase noise estimation unit configured to estimate a reception channel of the base station based on the DMRS, to uncover the OCC from a PTRS reception signal received in a predetermined resource element, to remove a channel component from the uncovered PTRS reception signal, and to estimate the phase noise using an average of calculation results of a plurality of PTRS reception signals distributed in a plurality of resource blocks (RBs).

7. A user equipment (UE) for decoding downlink data in a wireless communication system, the UE comprising:
  a transceiver configured to transmit and receive a signal; and
  a controller configured to receive, from a base station, phase tracking reference signal (PTRS) allocation information including PTRS port information and orthogonal cover code (OCC) information in a frequency domain, to receive, from the base station, a demodulation reference signal (DMRS) and a PTRS to which an OCC is applied according to the OCC information, to estimate a phase noise based on the DMRS and the PTRS, and to decode a data received from the base station by compensating for the phase noise,
  wherein the OCC information is configured such that the OCC is applied to the PTRS in the frequency domain, and
  wherein the controller applies the OCC to the PTRS based on at least one of a length or a phase of the OCC in case that the OCC is applied to the PTRS according to cyclic prefix orthogonal frequency-division multiplexing (CP-OFDM) in the frequency domain.

8. The UE as claimed in claim 7,
  wherein the PTRS is received by allocating a plurality of PTRS ports to the same resource and by applying the OCC to the PTRS, and
  wherein the controller comprises a phase noise estimation unit configured to estimate a reception channel of the UE based on the DMRS, to uncover the OCC from a PTRS reception signal received in a predetermined resource element, to remove a channel component from the uncovered PTRS reception signal, and to estimate the phase noise using an average of calculation results of a plurality of PTRS reception signals distributed in a plurality of resource blocks (RBs).

* * * * *